US011017439B2

(12) United States Patent
Shimura

(10) Patent No.: US 11,017,439 B2
(45) Date of Patent: *May 25, 2021

(54) AD FRAME MANAGEMENT SYSTEM FOR DISPLAYING WEB PAGE INCLUDING ADVERTISEMENT IN CORRESPONDENCE WITH BIDDING POPULARITY

(71) Applicant: DENTSU INC., Tokyo (JP)

(72) Inventor: Akihiro Shimura, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/864,045

(22) Filed: Apr. 30, 2020

(65) Prior Publication Data

US 2020/0273074 A1    Aug. 27, 2020

Related U.S. Application Data

(63) Continuation of application No. 16/263,849, filed on Jan. 31, 2019, now Pat. No. 10,679,257, which is a
(Continued)

(30) Foreign Application Priority Data

May 26, 2014   (JP) .............................. JP2014-108455

(51) Int. Cl.
   *G06Q 30/02*   (2012.01)
(52) U.S. Cl.
   CPC ..... *G06Q 30/0275* (2013.01); *G06Q 30/0277* (2013.01)
(58) Field of Classification Search
   None
   See application file for complete search history.

(56) References Cited

U.S. PATENT DOCUMENTS

2005/0216342 A1   9/2005  Ashbaugh
2008/0004990 A1*  1/2008  Flake ................. G06Q 30/0601
                                                         705/26.1
(Continued)

FOREIGN PATENT DOCUMENTS

JP   2001-514772    9/2001
JP   2011-529231   12/2011
(Continued)

OTHER PUBLICATIONS

Adam Barth, Collin Jackson, and John C. Mitchell. 2009. Securing frame communication in browsers. Commun. ACM 52, Jun. 6, 2009, 83-91. DOI:https://doi.org/10.1145/1516046.1516066 (Year: 2009).*

(Continued)

*Primary Examiner* — Christopher B Tokarczyk
(74) *Attorney, Agent, or Firm* — Muncy, Geissler, Olds & Lowe, P.C.

(57) ABSTRACT

A frame coordinating computer (154), upon receiving a bidding popularity from a bid management computer (152) (S1), determines whether a multiple-view video frame distributed as a content should be changed to an ad frame (S2). When it is determined that the multiple-view video frame distributed as the content should be changed to an ad frame, a change request is transmitted (S4). A content distributing computer (156P1), upon receiving such a change request (S11), changes one of content frames is changed to an ad frame (S12). Ad frame management system flexibly changes the number of ad frames in accordance with the advertisement demand by dynamically changing the number of ad frames.

14 Claims, 13 Drawing Sheets

Related U.S. Application Data continuation-in-part of application No. 14/655,086, filed as application No. PCT/JP2014/003204 on Jun. 16, 2014, now abandoned.

(56) References Cited

U.S. PATENT DOCUMENTS

| | | | |
|---|---|---|---|
| 2008/0154889 A1* | 6/2008 | Pfeiffer | G06F 16/738 |
| 2009/0319372 A1* | 12/2009 | Makeev | G06Q 30/02 705/14.55 |
| 2012/0198321 A1* | 8/2012 | Serena | G06Q 30/02 715/205 |
| 2013/0080264 A1 | 3/2013 | Umeda | |
| 2014/0074626 A1 | 3/2014 | Fukuhara | |
| 2014/0379491 A1 | 12/2014 | Takata et al. | |

FOREIGN PATENT DOCUMENTS

| | | |
|---|---|---|
| JP | 2012-068828 | 4/2012 |
| JP | 2014-052858 | 3/2014 |
| JP | 5457591 | 4/2014 |
| WO | 98/34189 | 8/1998 |
| WO | 2010/011876 | 1/2010 |

OTHER PUBLICATIONS

Extended European Search Report for corresponding European Application No. 14893561.2, dated Nov. 17, 2017 (disclosed with the IDS dated Nov. 27, 2017 in the parent U.S. Appl. No. 14/655,086, therefore no reference is submitted herein).

International Preliminary Report on Patentability (Including Translation) for International Application No. PCT/JP2014/003204, dated Dec. 8, 2016 (disclosed with the IDS dated Feb. 3, 2017 in the parent U.S. Appl. No. 14/655,086, therefore no reference is submitted herein).

Digital Marketing Lab "Ad Network System and its Characteristics, Digital Marketing Lab" (Including Machine Translation) http://dmlab.jp/adtech/adn.html (disclosed with the IDS dated Jun. 24, 2015 in the parent U.S. Appl. No. 14/655,086, therefore no reference is submitted herein; Discussed on p. 2 of the specification).

Notice of Allowance (Including Translation) for Japanese Patent Application No. 2014-528776, dated Sep. 1, 2014 (disclosed with the IDS dated Jun. 24, 2015 in the parent U.S. Appl. No. 14/655,086, therefore no reference is submitted herein).

International Search Report (Including Translation) for International Application No. PCT/JP2014/003204, dated Jul. 15, 2014 (disclosed with the IDS dated Dec. 15, 2015 in the parent U.S. Appl. No. 14/655,086, therefore no reference is submitted herein).

Office Action of corresponding EP application No. 14893561.2 dated May 10, 2019 (disclosed with the IDS dated Jul. 29, 2019 in the parent U.S. Appl. No. 16/263,849, therefore no reference is submitted herein).

Matthew Scherb, Free Content's Future: Advertising, Technology, and Copyright, 2004, Northwestern University Law Review, vol. 98, No. 4, pp. 1787-1824. (Year: 2004) (disclosed with form PTO-892 dated Feb. 5, 2020 in the parent U.S. Appl. No. 16/263,849, therefore no reference is submitted herein).

* cited by examiner

FIG.1 <RELATED ART>

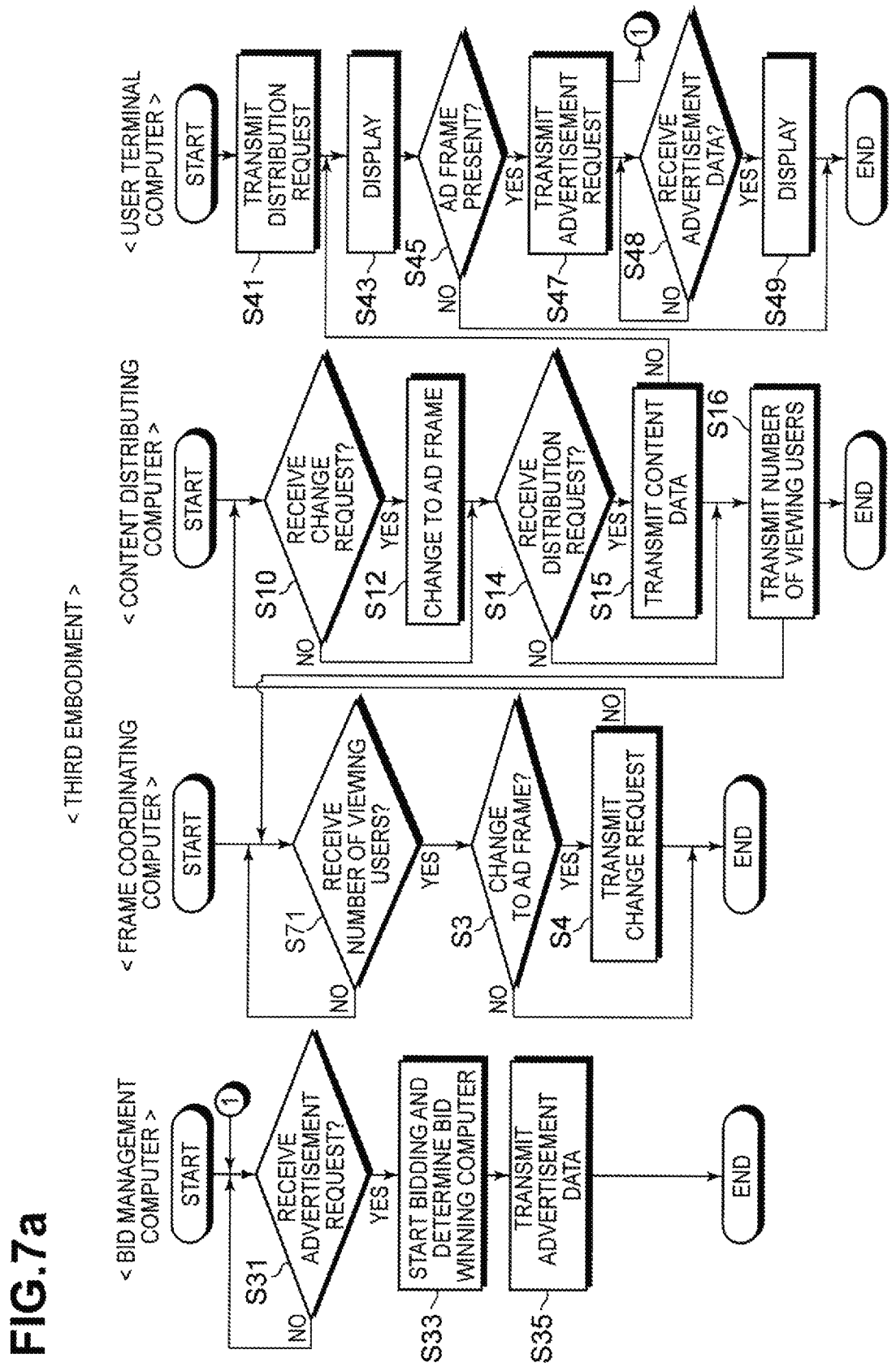

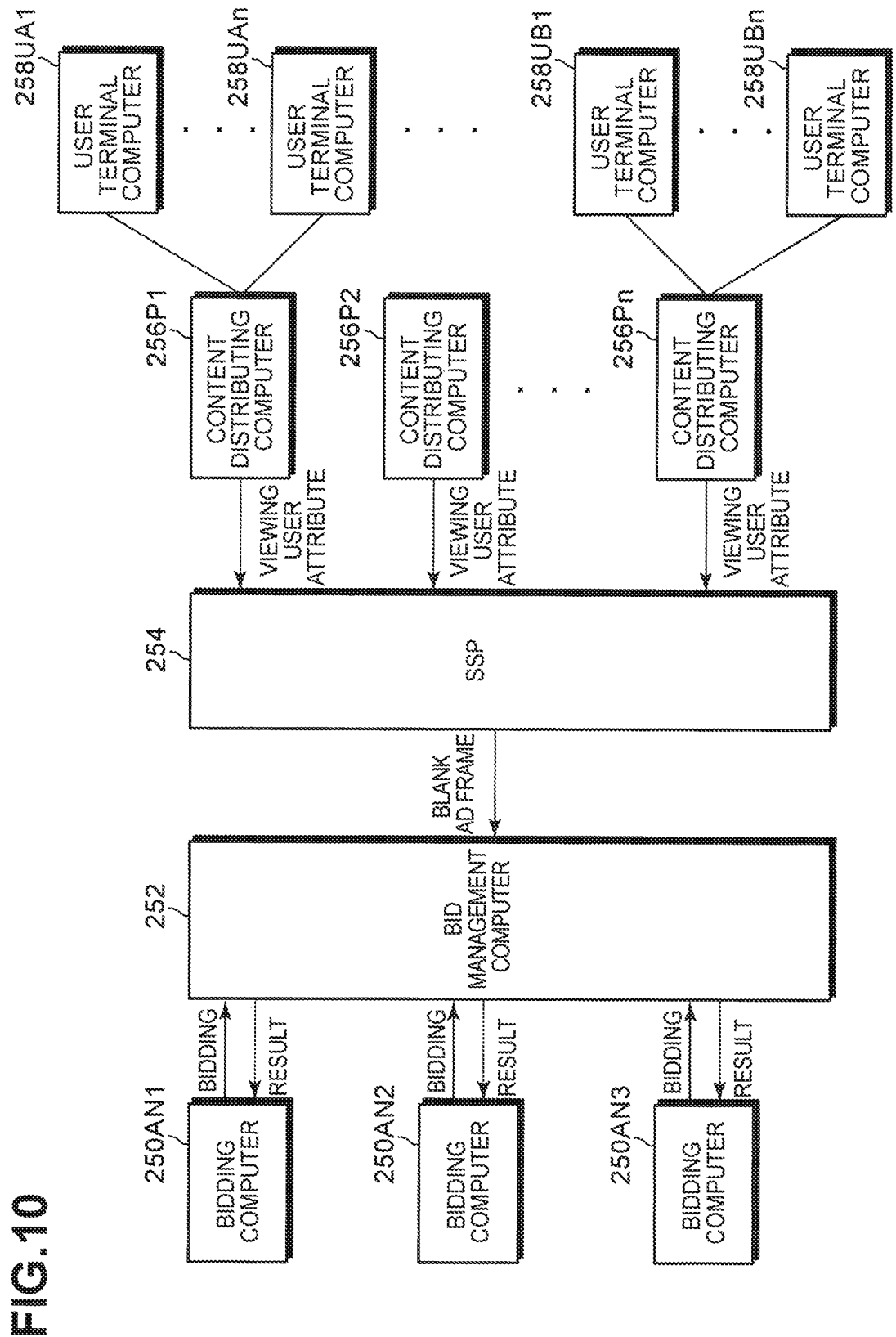

AD FRAME MANAGEMENT SYSTEM FOR DISPLAYING WEB PAGE INCLUDING ADVERTISEMENT IN CORRESPONDENCE WITH BIDDING POPULARITY

CROSS REFERENCE TO RELATED APPLICATIONS

This application is a continuation of U.S. application Ser. No. 16/263,849 filed on Jan. 31, 2019, which is a continuation in part of U.S. application Ser. No. 14/655,086, filed on Jun. 24, 2015. The application Ser. No. 14/655,086, is based on PCT Application No. PCT/JP2014/003204, filed on Jun. 16, 2014, claiming priority to Japanese Patent Application No. 2014-108455 filed on May 26, 2014. The disclosures of these applications are incorporated herein by reference.

TECHNICAL FIELD

The present invention relates to an ad frame management system that controls an ad frame transaction market on the Internet delivery, and more particularly to a dynamic switching processing for switching from a content frame to an ad frame, or vice versa.

BACKGROUND ART

Auctions for banner ad frames directed toward a person requesting to view a content on the Internet are held in order to display effective advertisements together with such content as a news content on the Internet according to a user attribute. Such auctions are held individually at respective timings at which a person requesting to view a content requests a content. Such a system is called a real-time bidding (RTB) platform.

FIG. 1 shows an overview of an ad frame determining system 51. A content distributing computer 56P1 is for distributing a content on which a banner ad frame is to be provided, and includes, for example, a news site and an information providing site. Each of ad frame bidding computers 50AN1 through 50AN3 submits a bid to a bid management computer 52 based on a request from an advertiser. The bid management computer 52 manages bids for the ad frames present in the content of a content distributing computer 56P1.

When a user terminal computer 58UA1 transmits a content view request to the content distributing computer 56P1, the content distributing computer 56P1 transmits the content having a script demanding an advertisement tag included therein, with data within the ad frame being blank. The user terminal computer 58UA1 that has received the content displays the content, and executes this script so as to request an advertisement tag to the bid management compute 52, accompanied by viewing user attributes.

The bid management computer 52 provides the viewing user attributes to the ad frame bidding computers 50AN1 through 50AN3, and requests to bid on the ad frame of the content which is to be transmitted the above-mentioned user terminal computer 58UA1. The ad frame bidding computers 50AN1 through 50AN3 calculate bid prices based on the viewing user attributes in accordance with pre-stored instructions of the advertiser, and respectively submit a bid. At this time, the ad frame bidding computers 50AN1 through 50AN3, in preparation for the case one of them wins the bid, transmit the advertisement tag to the bid management computer 52 together with the bid.

The bid management computer 52 compares the bids submitted by the respective ad frame bidding computers 50AN1 through 50AN3 to process a winning bid. In this case, it shall be assumed that the ad frame bidding computer 50AN1 has won the bid.

The bid management computer 52 transmits the advertisement tag of the ad frame bidding computer 50AN1 that has won the bid to the user terminal computer 58UA1. The user terminal computer 10 acquires and displays a banner ad based on this advertisement tag. Accordingly, in an Internet advertisement, it becomes possible to provide advertisements individually according to the viewing user attributes.

CITATION LIST

Non Patent Literature

Non Patent Literature 1: Ad Network System and its Characteristics, Digital Marketing Lab, http://dmlab.jp/adtech/adn.html

SUMMARY OF INVENTION

Technical Problem

In the above-mentioned screen, advertisement data is displayed in an ad frame area from among a plurality of areas defined by dividing a display area of the screen into a plurality of sections. A size of the ad frame is predetermined. Accordingly, it was difficult for a person other than the creator of the display screen to increase the number of ad frames without changing the screen layout and to provide another advertisement on a computer screen of a user due to physical restrictions imposed on the display area of the computer screen.

The present invention is directed to solving the above-mentioned problem so as to provide an ad frame management system capable of increasing the number of ad frames, in a display screen of a computer with physical restrictions imposed thereon, while maintaining an overall layout of the screen.

Solution to Problem (1) An ad frame management system according to the present invention includes: a content distributing computer that distributes, to a user terminal computer, a distribution data including an ad frame and a content frame on one screen; a bid management computer that manages bidding of the ad frames according to the real-time bidding platform; and a plurality of ad frame bidding computers that submit bids to the bid management computer, the ad frame management system including a frame coordinating computer having a frame increase/decrease determining means storing therein a rule for increasing/decreasing the number of ad frames and that determines whether to increase/decrease the number of ad frames, the increase/decrease of the number of the ad frames being executed by changing the content frame to the ad frame or changing the ad frame to the content frame without changing the total number of content frames and ad frames, and a change instructing means that gives a frame type change order to the content distributing computer when the frame increase/decrease determining means determines to increase/decrease the number of ad frames.

(2) A frame coordinating computer according to the present invention is connected to a content distributing computer that distributes, to a user terminal computer, a distribution data including an ad frame and a content frame on one screen and to a bid management computer that manages bidding of the ad frames according to the real-time bidding platform, the frame coordinating computer including: a frame increase/decrease determining means storing therein a rule for increasing/decreasing the number of ad frames and that determines whether to increase/decrease the number of ad frames, the increase/decrease of the number of the ad frames being executed by changing the content frame to the ad frame or changing the ad frame to the content frame without changing the total number of content frames and ad frames, and a change instructing means that gives a frame type change order to the content distributing computer when the frame increase/decrease determining means determines to increase/decrease the number of ad frames.

(3) A content distributing computer according to the present invention is connected to a frame coordinating computer and a user terminal computer, and includes: a distribution request receiving means that receives a distribution request from the user terminal computer for the distribution data; a distribution data storing means that stores a distribution data including an ad frame and a content frame on one screen; and a distribution means that distributes the distribution data upon receiving the distribution request, the content distributing computer including a changing means for changing the distribution data stored in the storing means, upon receiving an order to change the number of frames from the frame coordinating computer, by changing the content frame to the ad frame or changing the ad frame to the content frame without changing the total number of content frames and ad frames so as to increase/decrease the number of ad frames.

(4) An ad frame management system according to the present invention includes: a content distributing computer that distributes, to a user terminal computer, a distribution data including an ad frame and a content frame on one screen; and an ad frame purchasing computer that requests purchasing of the ad frame, the ad frame management system including a frame coordinating computer having a frame increase/decrease determining means storing therein a rule for increasing/decreasing the number of ad frames and that determines whether to increase/decrease the number of ad frames, the increase/decrease of the number of the ad frames being executed by changing the content frame to the ad frame or changing the ad frame to the content frame without changing the total number of content frames and ad frames; and a change instructing means that gives a frame type change order to the content distributing computer when the frame increase/decrease determining means determines to increase/decrease the number of ad frames, wherein the frame increase/decrease determining means changes a content frame to an ad frame when a request to ensure an impression frame having a fixed price is given from the ad frame purchasing computer to the content distributing computer.

(5) An ad frame management system according to the present invention includes: a content distributing computer that distributes, to a user terminal computer, a distribution data including an ad frame and a content frame on one screen; a bid management computer that manages bidding of the ad frames according to the real-time bidding platform; and a plurality of ad frame bidding computers that submit bids to the bid management computer, wherein two types of ad frames are set, namely a fixed ad frame which had initially been an ad frame and a dynamic ad frame which had been changed from the content frame to the ad frame, and which type an ad frame belongs to is specified at the time of bidding, and the ad frame bidding computers submit different bid prices for the fixed ad frame and the dynamic ad frame.

(6) An ad frame management system according to the present invention includes: a content distributing computer that distributes, to a user terminal computer, a distribution data including an ad frame and a content frame on one screen; a bid management computer that manages bidding of the ad frames according to the real-time bidding platform; and a plurality of ad frame bidding computers that submit bids to the bid management computer, wherein two types of ad frames are set, namely a fixed ad frame which had initially been an ad frame and a dynamic ad frame which had been changed from the content frame to the ad frame, and which type an ad frame belongs to is specified at the time of bidding, and a bid is submitted only for the dynamic ad frame.

In the present invention, an "ad frame" is not only a term that specifies a space for displaying an advertisement, but also a term that refers to a concept including information that specifies a position to display an advertisement without clarifying the space for displaying the advertisement. Also, an advertisement displayed in an "ad frame" may be of various kinds such as an image (including a video) and text data, further including opinion advertisements and the like.

Features, other objects, use, and advantages of the present invention will become more apparent from the following description of the embodiments when taken in conjunction with the accompanying drawings in which:

BRIEF DESCRIPTION OF DRAWINGS

FIG. 7a is a flowchart illustrating an ad frame increase processing and advertisement display processing according to the third embodiment;

FIG. 10 is a system overview in the case where a frame coordinating computer is a computer configuring a Supply Side Platform (SSP).

EMBODIMENTS OF THE INVENTION

1. Overall Configuration

Functional Block Diagram

Figure 1:
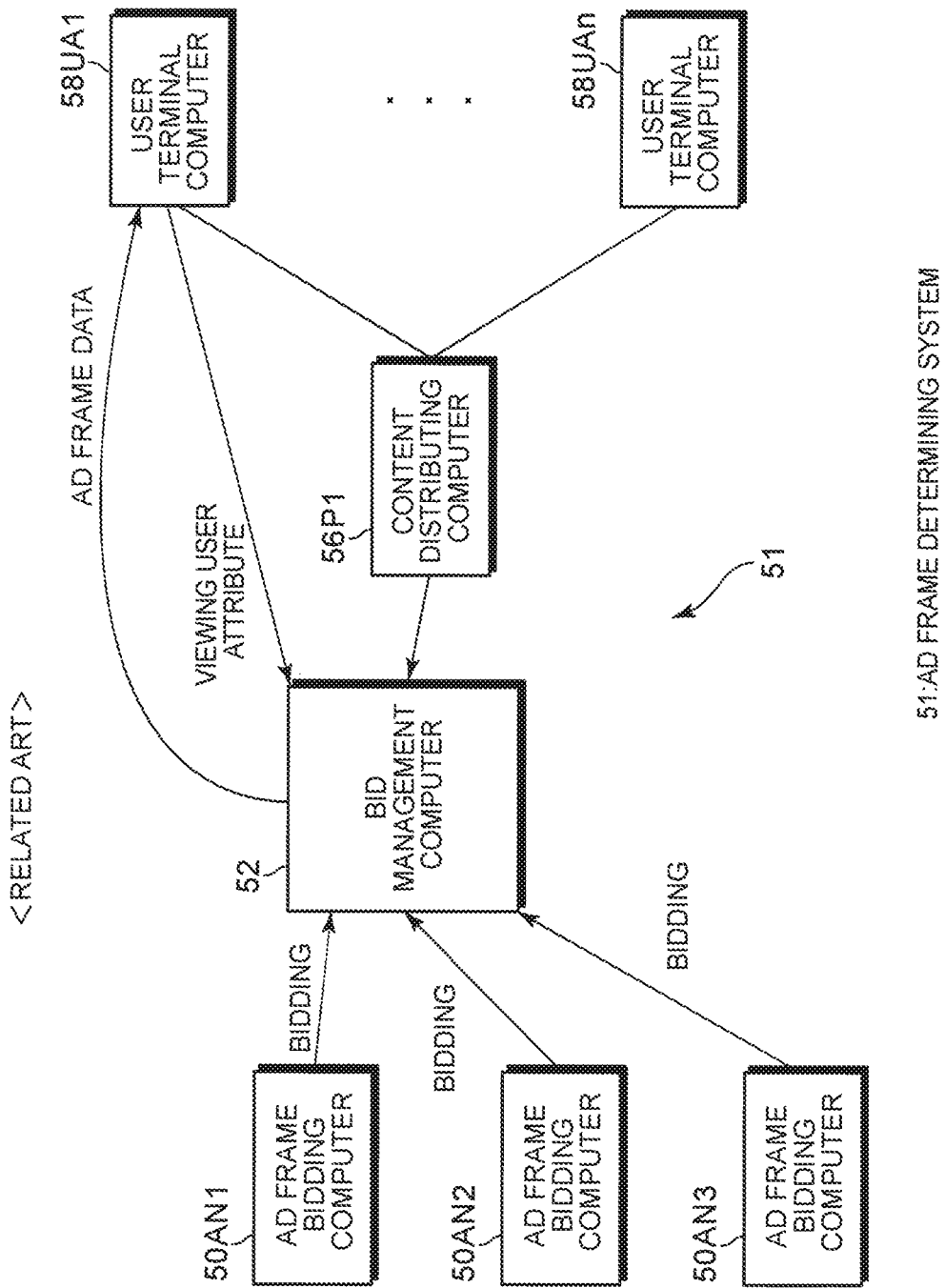
FIG. 1 is an overall schematic view illustrating a conventional ad bidding system 51.
Figure 2:
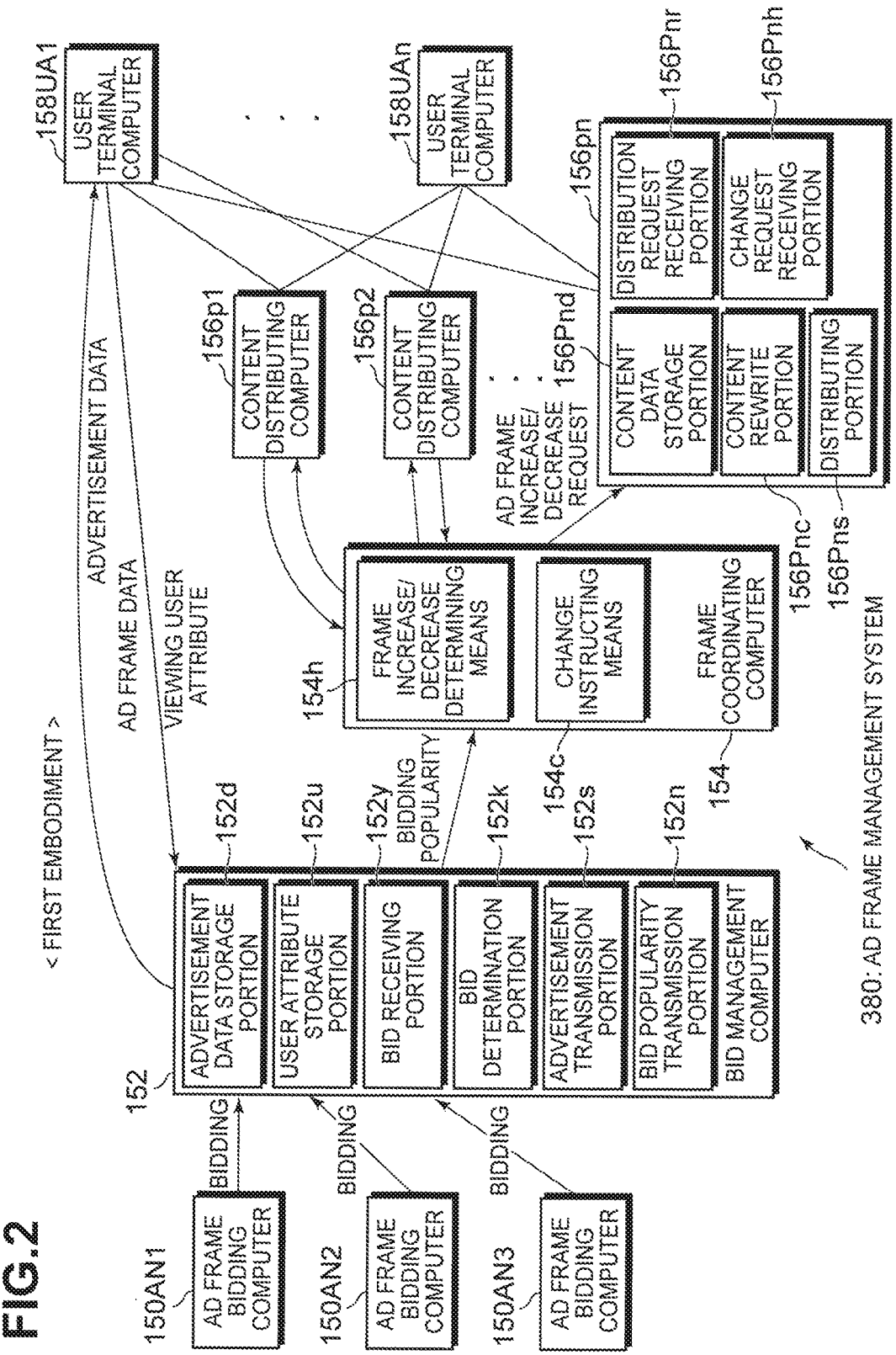
FIG. 2 is a view illustrating a group of computers configuring an ad frame management system. 100 according to the present invention.

FIG. 2 shows a functional block diagram of an ad frame management system 100 according to the present invention. The ad frame management system 100 includes a plurality of ad frame bidding computers 150AN1 through AN3, a bid management computer 152, a frame coordinating computer 154, a content distributing computer 156P1, and user terminal computers 158UA1 through UAn.

Figure 3:
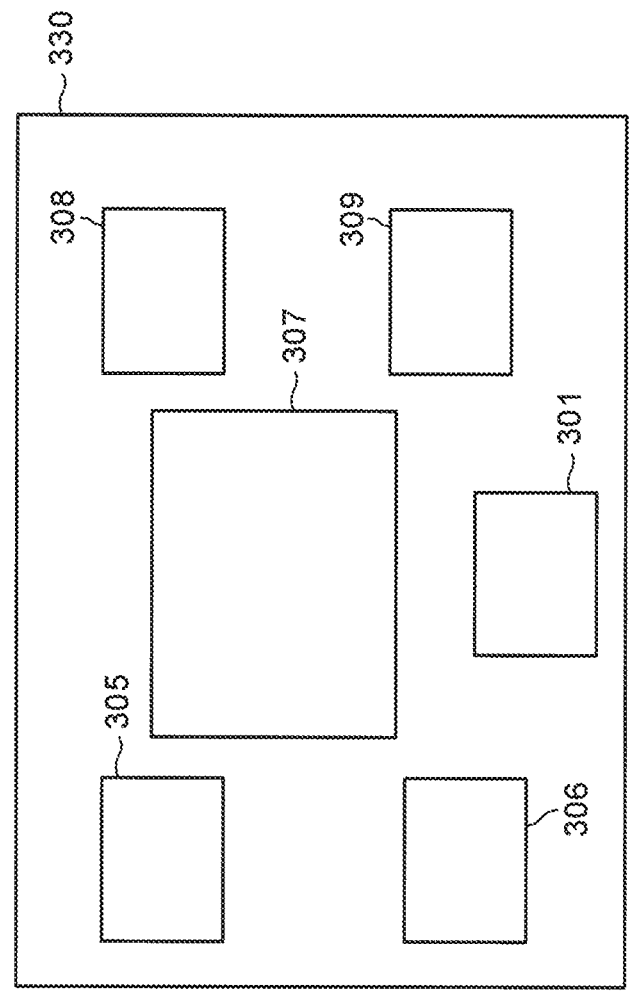
FIG. 3 is a view of an example of a screen to be distributed to a user terminal computer.

The content distributing computer 156P1 stores therein multi-view video contents including the ad frame 301 and the multi-view video frames 303 through 309, as shown in FIG. 3, and the content distributing computer 156P1 distributes the above-mentioned content upon a distribution request from the user terminal computers 158UA1 through UAn.

The ad frames in the content distributed by the content distributing computer 156P1 are managed by the bid management computer 152. To be specific, each of the ad frame bidding computers 150AN1 through AN3 submits, to the bid management computer 152, a bid price together with advertisement data for the case of winning the bid.

In a case where a plurality of pieces of advertisement data with different sizes is submitted to the bid management computer 152, the bid management computer 152 stores such pieces of advertisement data in an advertisement data storage portion 152d.

More specifically, the bid management computer 152 includes the advertisement data storage portion 152d, a user attribute storage portion 152u, a bid receiving portion 152r, a bid determination portion 152k, an advertisement transmission portion 152s, and a bid popularity transmission portion 152n.

The advertisement data storage portion 152d stores advertisement data submitted by the ad frame bidding computers. The user attribute storage portion 152u receives, from the user terminal computers 158UA1 through 158UAn, ad frame data indicating the presence of an ad frame as well as viewing user attributes, and stores the received data.

The bid receiving portion 152r receives the bids from the ad frame bidding computers. The bid determination portion 152k determines the winning ad frame bidding computer for a target ad frame, by real-time bidding method. The advertisement transmission portion 152s transmits, to the user terminal computer 158UA1, the advertisement data of the determined ad frame bidding computer together with the ad frame data. Accordingly, advertisement data according to the attributes of the user terminal computer can be distributed in the same manner as that of a conventional method.

The bid popularity transmission portion 152n transmits the number of bids for each bidding to the frame coordinating computer 154.

The frame coordinating computer 154 includes a frame increase/decrease determining means 154H and a change instructing means 154C. The frame increase/decrease determining means 154H has a rule stored therein for increasing/decreasing the number of the ad frames, and determines whether to increase/decrease the number of the ad frames. In the present embodiment, a rule is adopted so that the number of ad frames is increased in a case where the bid popularity exceeds a threshold value. However, the rule is not limited thereto. The bid popularity can be determined based on, for example, whether the real-time bidding has been repeated for a predetermined number of times or more.

Since the increase/decrease of the number of the ad frames are executed by changing a content frame to an ad frame, or changing an ad frame to a content frame, the total number of content frames and ad frames is not changed.

The change instructing means 154C gives an ad frame increase/decrease order for changing the frame type to the content distributing computer 156P1 in a case where the frame increase/decrease determining means 154H determines to increase/decrease the number of the ad frames.

The content distributing computer 156Pn includes a content data storage portion 156Pnd, a content data rewrite portion 156PnC, a distribution request receiving portion 156Pnr, a change request receiving portion 156Pnh, and a distributing portion 156PnS.

The content data storage portion 156Pnd stores HTML data and image data (including sound data and video data) to be read in the HTML data. For example, the content data storage portion 156Pnd stores therein an ad frame 301 and multi-view video content data including multi-view video frames 303 through 309, as shown in FIG. 3.

The content rewrite portion 156PnC changes, upon receipt of the ad frame increase/decrease request from the frame coordinating computer 154, the HTML data stored in the content data storage portion 156Pnd. More specifically, the content data rewrite portion 156PnC changes, upon receipt of an ad frame increase request, a tag of a predetermined frame, from among the HTML data, from a content frame tag to an ad frame tag. By changing the tag in this way, the number of ad frames can be increased without changing the total number of the content frames and the ad frames. In the meantime, upon receipt of an ad frame decrease request, the content data rewrite portion 156PnC changes the tag of a predetermined frame from an ad frame tag to a content frame tag.

The predetermined tag can be, for example, a tag that declares that a change to an ad frame or a change to a content frame is possible.

The distribution request receiving portion 156Pnr receives a distribution request from a user terminal computer. The distributing portion 156PnS distributes, upon receiving the distribution request, the HTML data stored in the content data storage portion 156Pnd and the content data linked to the HTML data to the user terminal computer. Here, the content data for a frame that has been changed to an ad frame does not have to be transmitted.

The same applies to the other content distributing computers 156P1 through 156Pn−1.

As described above, in a case where an ad frame change order is received from the frame coordinating computer 154, the number of the ad frames can be increased without changing the total number of the content frames and the ad frames by changing the content frame to the ad frame. Accordingly, in a case where a distribution request is received from another user terminal computer, the advertisement at the increased number of ad frames becomes possible. For example, the multi-view video frame 306 illustrated in FIG. 3 becomes an ad frame.

2. Hardware Configuration

Figure 4:
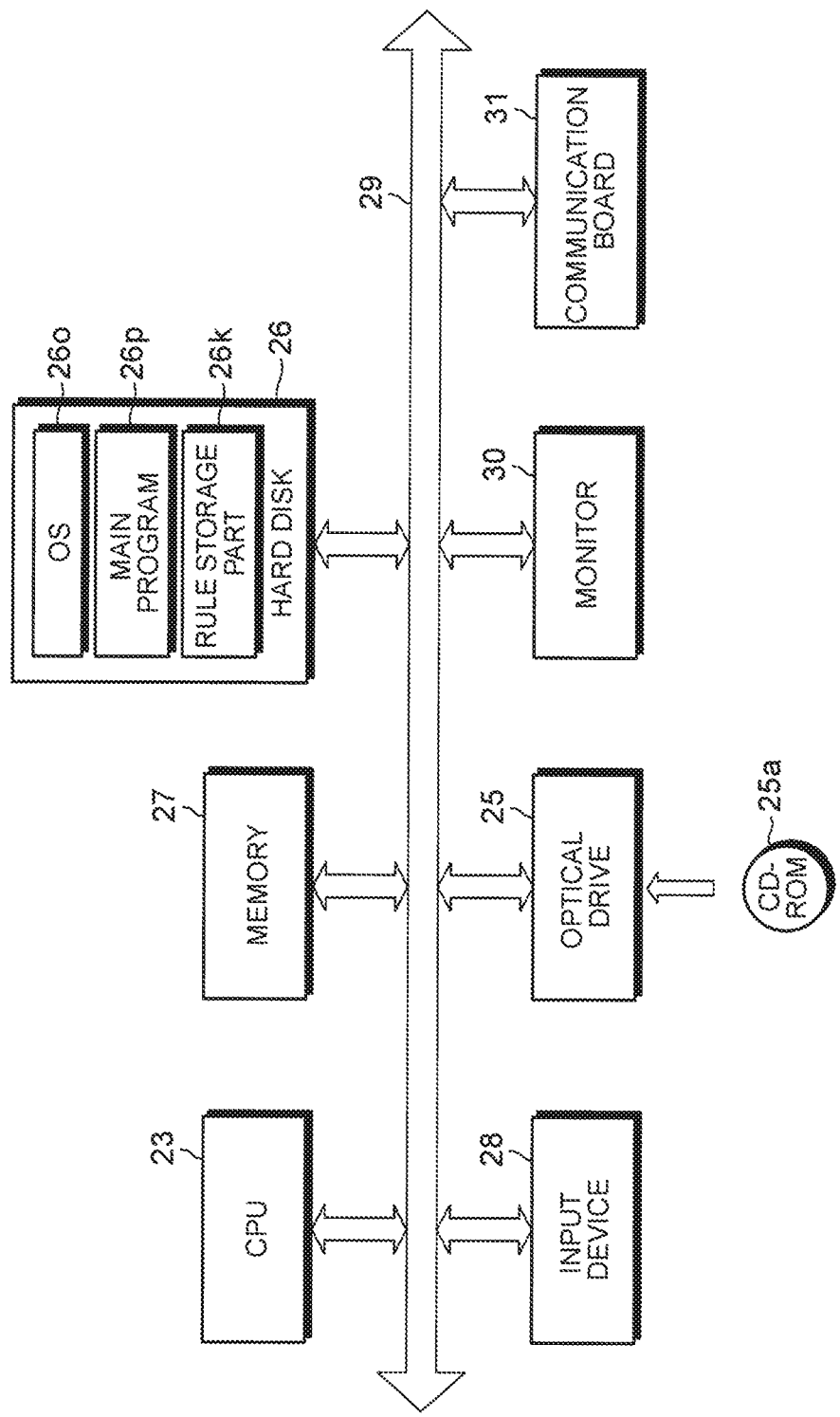
FIG. 4 is a view illustrating a hardware configuration of a frame coordinating computer 154.

The hardware configuration of the frame coordinating computer 154 in the ad frame management system 100 illustrated in FIG. 2 will be described with reference to FIG. 4. FIG. 4 shows an example of the hardware configuration of the frame coordinating computer 154 that is configured using a CPU.

The frame coordinating computer 154 includes a CPU 23, a memory 27, a hard disk 26, a monitor 30, an optical drive 25, an input device 28, a communication board 31, and a bus line 29. The CPU 23 controls respective components via the bus line 29 in accordance with respective programs stored in the hard disk 26.

A hard disk 26 stores therein an operating system program 26o (hereinafter referred to as the OS) and a main program 26p. Processing of the main program 26p will be described later.

A rule storage part 26k stores therein a rule to be applied when switching an individual video frame to an ad frame, as described later.

Note that, in the present embodiment, Windows2008 R2 (registered trademark or trademark) has been adopted as the OS program 26o, however, the OS program 26o is not limited thereto.

The respective above-mentioned programs have been read out from a CD-ROM 25a, in which the programs are stored, via the optical drive 25 to be installed in the hard disk 26. Note that, the programs such as those recorded in a flexible disk (FD) and an IC card, in addition to the CD-ROM, may be installed in the hard disk via a computer-readable recording medium. Further, such a program may be downloaded using a communication line.

In the present embodiment, the program is installed from a CD-ROM into the hard disk 26 so as to indirectly execute the program stored in the CD-ROM by the computer. However, execution of the program is not limited thereto, and the program stored in the CD-ROM may be directly executed by the optical drive 25. Computer-executable programs include those that are directly executable by only installing the program as is, and those that first need to be converted to other forms or the like (for example, decompressing a compressed program, or the like), and further include those that are executable in combination with other module part. The hardware configurations of other computers are the same.

3. Processing for Changing the Number of Frames

Figure 5:
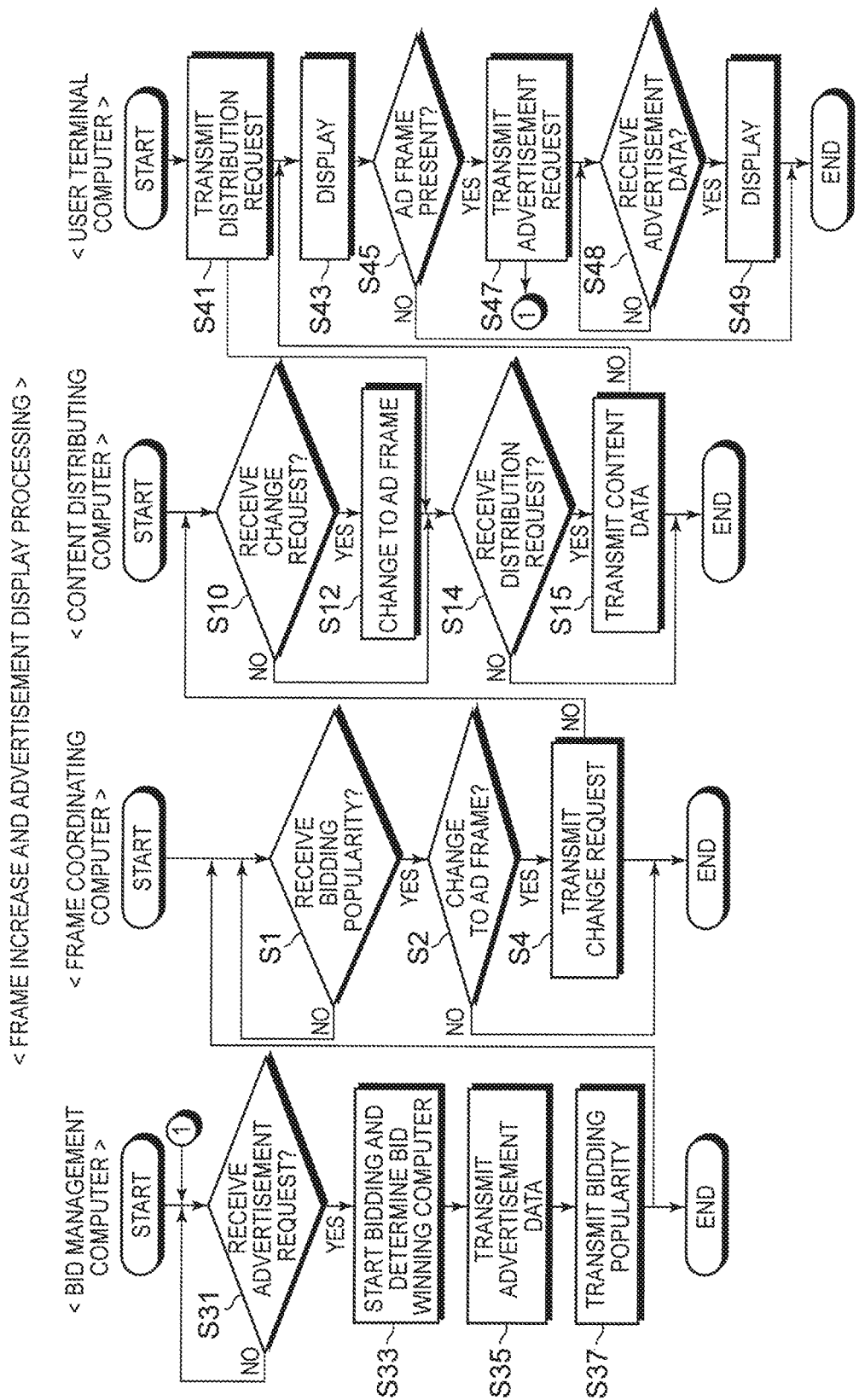
FIG. 5 is a flowchart illustrating an ad frame increase processing and advertisement displaying.

FIG. 5 is a flowchart illustrating a frame increase processing of the frame coordinating computer 154 and advertisement displaying of the a user terminal computer.

A case where the number of ad frames is increased based on a content distribution request transmitted from the user terminal computer 158UA1 to the content distributing computer 156P1 will be described below as an example.

The user terminal computer 158UA1 transmits the content distribution request to the content distributing computer 156P1 (step S41 in FIG. 5). A CPU (not illustrated) of the content distributing computer 156P1 determines whether a change request has been received (step S10). In this case, since the CPU has not received a change request, the processing proceeds to step S14 and a determination is made as to whether the distribution request has been received. Since the CPU has received the distribution request, the content distributing computer 156P1 transmits the content data to the user terminal computer 158UA1 (step S15). For example, the multi-view video image content data including the ad frame 301 and the multi-view video frames 303 through 309, illustrated in FIG. 3, are transmitted.

The CPU (not illustrated) of the user terminal computer 158UA1 displays, upon receiving the multi-view video image content data, the received data (step S43). The CPU determines whether an ad frame is included in the multi-view video image content data (step S45). More specifically, the determination can be made based on whether an advertisement tag is included in the HTML data. In this case, since an ad frame 301 (refer to FIG. 3) is present, the CPU transmits an advertisement request including the user attributes and area defining data of an ad frame to a bid management computer designated by the advertisement tag (step S47). In this case, assume that the bid management computer 152 is designated by the ad frame tag.

The CPU of the bid management computer 152 determines whether an advertisement request is received (step S31). Upon receiving an advertisement request, the bid management computer starts bid processing (real-time bidding). Here, the computer that has submitted the highest bid and for which an advertisement matching the size of the area defining data is stored in the advertisement data storage portion 152d (refer to FIG. 3) will be determined as the bid-winning computer. "Matching the size of the area defining data" refers to a case where the size of an advertisement matches the size of the area defining data. Accordingly, the ad frame bidding computer has stored in advance in the bid management computer 152, a plurality of types of the same advertisement depending on the size of the frame to display the advertisement. The ad frame bidding computer refers to the user attributes in the advertisement request to determine the bid price.

The CPU of the bid management computer 152 transmits the advertisement data of the determined ad frame bidding computer to the user terminal computer 158UA1 as the advertisement data in response to the advertisement request (step S35).

In this way, the advertisement data that matches the user attributes can be distributed to the user terminal computer.

Further, the CPU of the bid management computer 152 transmits the bid popularity to the frame coordinating computer 154 (step S37). In the present embodiment, the number of bids submitted is supplied as the bid popularity.

The CPU 23 of the frame coordinating computer 154 determines whether the bidding popularity is received (step S1 in FIG. 5). In a case where the bidding popularity is received, the CPU 23 determines whether the multi-view video frame for distributing the content should be changed to an ad frame (Step S2).

In the present embodiment, a threshold value is set in advance, and a rule is adopted so that the number of ad frames is increased by one in a case where the number of bids exceeds the threshold value.

The CPU 23 of the frame coordinating computer 154 transmits a change request in a case where it is determined that the multi-view video frame for distributing the content should be changed to an ad frame (step S4 in FIG. 5).

The content distributing computer 156P1 determines whether the change request is received (S10), and in a case where the change request is received, changes the multi-view video frame to an ad frame (step S12). In the present embodiment, one of the multi-view video frames 306 of the content distributing computer 156P1 is changed to an ad frame.

Consequently, the number of the ad frames of the content distributing computer 156P1 becomes two.

Next, in a case where a content distribution request is transmitted from another user terminal computer in a similar manner, the processing proceeds to steps S41 to S45. Then, bidding for the two ad frames is held, and the ad frames are displayed on the user terminal computer 158U together with the content data. Since the bid processing is the same as that described above, description thereof will be omitted.

In this way, the ad frames of the content distributing computer 156P1 are dynamically changed in accordance with the bidding popularity, and an advertisement is displayed in the increased ad frame of the user terminal computer.

In the present embodiment, an advertisement matching the size of the area defining data is selected. However, an advertisement can be determined as matching in size if the aspect ratios are the same and enlarging or reducing the advertisement results in the same size of the area defining data. This is because the design remains unchanged as long as the aspect ratio of the advertisement data remains unchanged.

In the present embodiment, the number of bids submitted was adopted as the measurement for bidding popularity, a change rate of the number of bids submitted may also be adopted. Alternatively, a bid price may also be adopted. As the bid price, the highest price among the bidders, the total of the bid prices submitted by the plurality of bidders, and the like can be adopted.

Also, in the present embodiment, when a change request is received from the frame coordinating computer 154$k$, the content frame is changed automatically to an ad frame. However, the change to an ad frame may also be executed by storing the change rule in the content distributing computer in advance, and upon receiving the afore-mentioned change request, determining whether the change rule applies, and if it does, changing the content frame to an ad frame.

In the present embodiment, the number of ad frames is increased without changing the total number of content frames and ad frames by changing a content frame to an ad frame. However, alternatively, an ad frame may be changed to a content frame to decrease the number of ad frames without changing the total number of content frames and ad frames. By changing the number of ad frames dynamically as thus, the number of ad frames can be changed flexibly in accordance with a demand for the advertisement.

4. Second Embodiment

In the first embodiment, the number of ad frames was changed in accordance with the bidding popularity. However, the ad frames may also be changed in accordance with a user operation of the user terminal computer. The processing carried out in this case will be described with reference to FIG. 6.

The content distributing computer 156P1 further includes a user operation data acquisition portion 156Pnu in comparison with the first embodiment. The user operation data acquisition portion 156Pnu acquires user operation information in video viewing of a user from a user terminal computer 158U. The user operation information includes, for example, active viewing processing such as a frequency of switching screens in viewing of a multi-view video, a volume adjustment, a playback position adjustment, and a screen size adjustment. The user operation data acquisition portion 156Pnu transmits the user operation information as an active viewing degree to a frame coordinating computer 364. A frame increase/decrease determining means 364$h$ of the frame coordinating computer 364 changes the number of ad frames in accordance with the active viewing degree. Such information can be gathered using a cookie.

Changing to an ad frame in accordance with the active viewing degree includes changing a content frame to an ad frame in a case where the active viewing degree is high, and vice versa.

A known framework can be used to gather data about the active viewing processing, for example, the framework can be such that a tag for transmitting the number of clicks to the frame coordinating computer 384 can be embedded in a content of the content distributing computer 156P1 and the number of clicks is transmitted to the frame coordinating computer 384 from the user terminal computer 158U.

Figure 6:
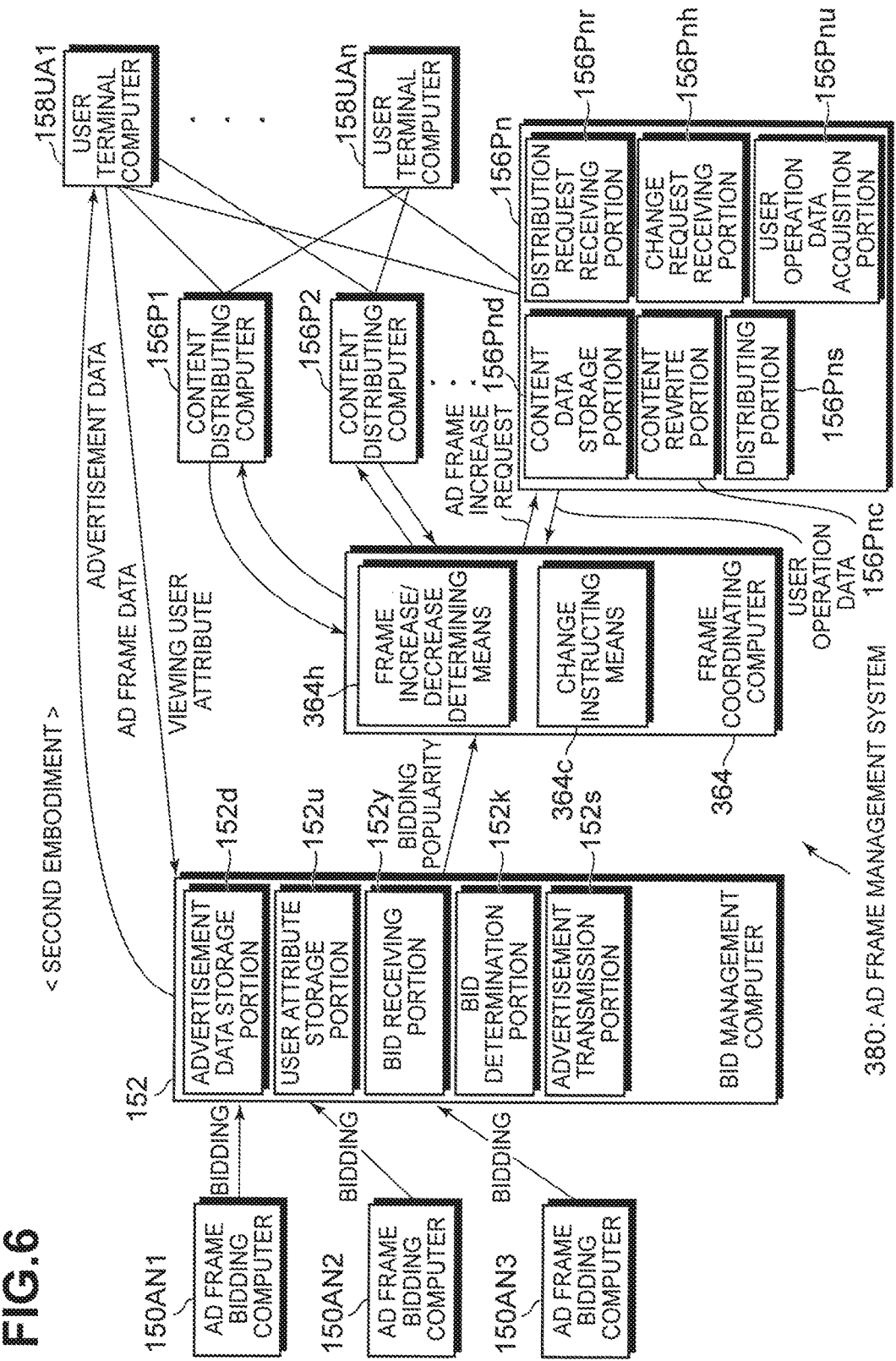
FIG. 6 is a functional block diagram illustrating an ad frame management system 360 according to a second embodiment.
Figure 6A:
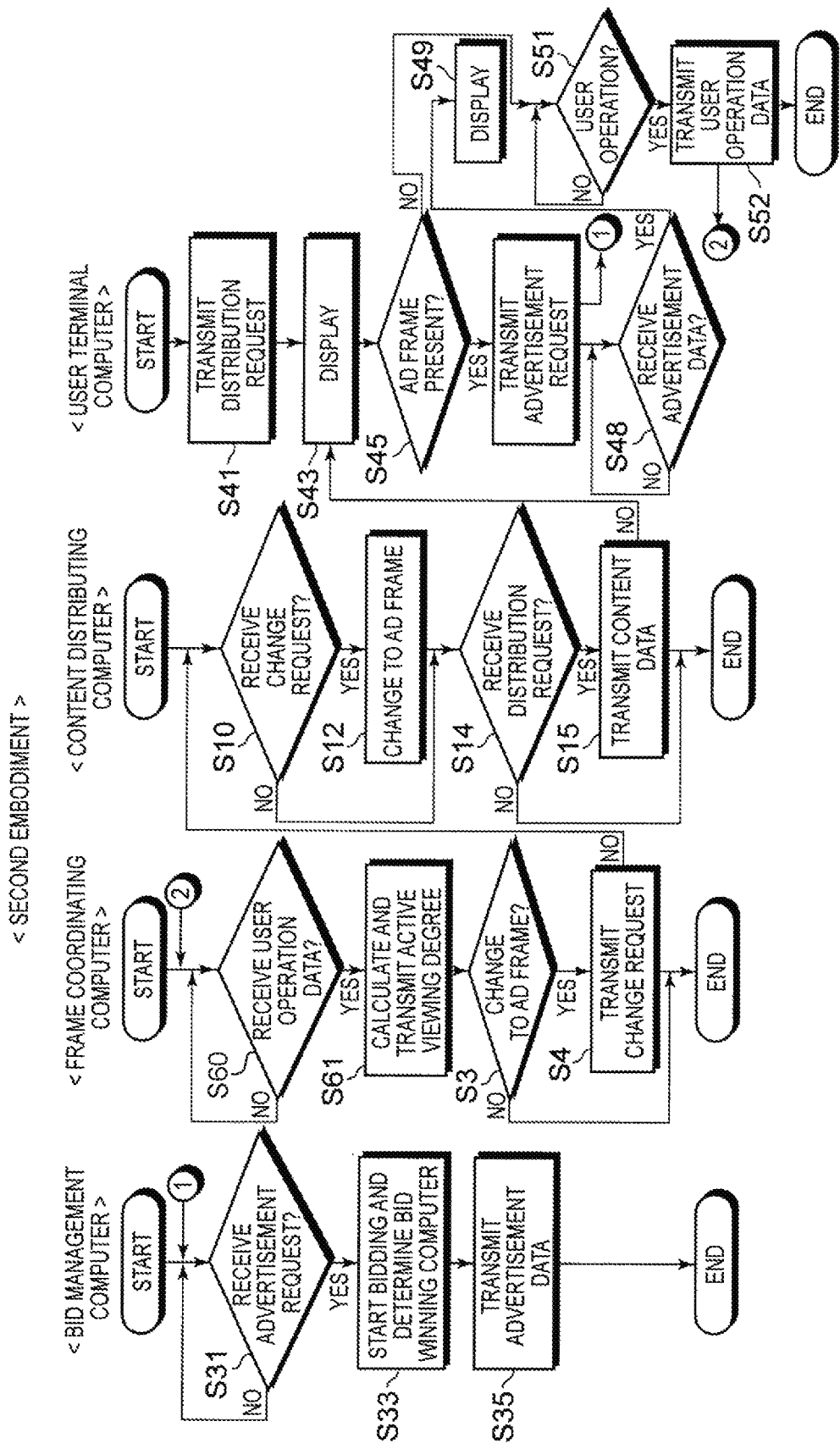
FIG. 6a is a flowchart illustrating an ad frame increase processing and advertisement display processing according to the second embodiment.

Specific processing carried out in this case will be described with reference to FIG. 6$a$. The processing carried out is the same as that of the first embodiment, from making a content distribution request to the content distributing computer 156P1 from the user terminal computer 158UA1, distributing the content data and the advertisement data to the user terminal computer, and to the process of displaying the data. The present embodiment differs from the first embodiment in that it does not include the processing of step S37 and that it includes the processing below.

The CPU of the user terminal computer 158 UA1 determines whether there is a user operation (step S51), and if there is, the user operation data is transmitted to the frame coordinating computer 154 (step S52). The user operation includes active viewing processing such as the frequency of switching screens in viewing of a multi-view video, a volume adjustment, a playback position adjustment, and a screen size adjustment.

The CPU of the frame managing computer 154 determines whether the user operation data has been received (step S60), and upon receiving the user operation data, calculates the active viewing degree. The active viewing degree can be obtained by calculating a total score per unit time by adding, for example, one point per operation for active viewing processing such as the frequency of switching screens in viewing of a multi-view video, a volume adjustment, a playback position adjustment, and a screen size adjustment. The CPU determines whether the multi-view video frame for distributing the content should be changed to an ad frame (step S3). The processing thereafter is the same.

In this way, the ad frames of the content distributing computer 156P1 are dynamically changed in accordance with the active viewing degree, and an advertisement is displayed in the increased ad frame of the user terminal computer.

Accordingly, a content frame to be changed to an ad frame can be changed to an ad frame in accordance with an operation of an input device on the screen during viewing of the content by the user.

Note that, in the present embodiment, a viewing operation history of the terminal itself is acquired by the distributing computer to implement various analyses, however, results obtained by processing the data to some extent at the terminal may be sent to the distribution computer to be stored therein.

5. Third Embodiment

Figure 7:
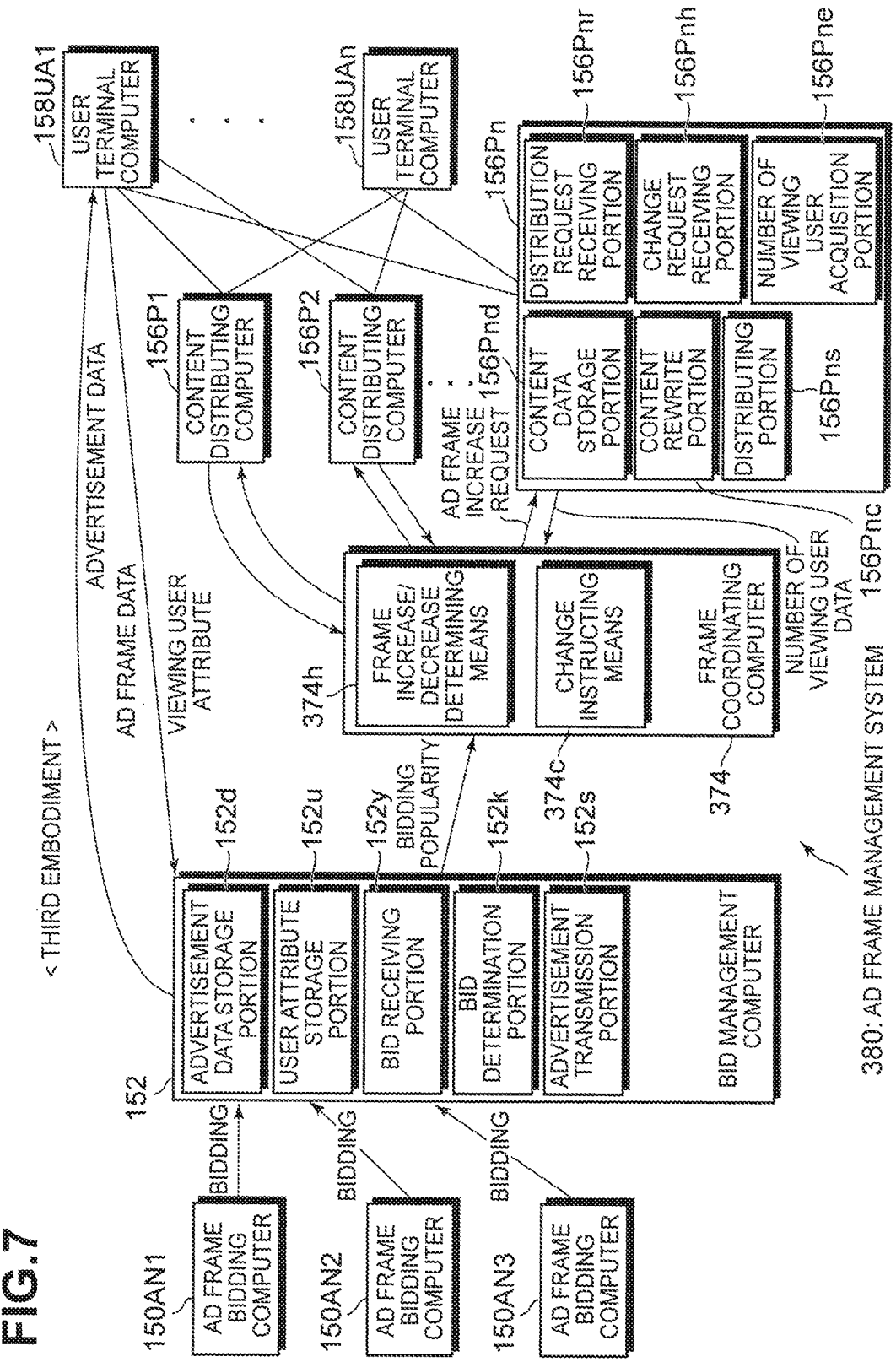
FIG. 7 is a functional block diagram illustrating an ad frame management system 370 according to a third embodiment.

The number of ad frames can be changed in accordance with the change in the number of viewing users per unit time of the content distributing computer. The processing carried out in this case will be described with reference to FIG. 7.

The content distributing computer 156P1 includes the number of viewing user acquisition portion 156Pne in comparison to the first embodiment. The number of viewing user acquisition portion 156Pne transmits the number of Web page viewing user to a frame coordinating computer 374. A frame increase determining means 374$h$ of the frame coordinating computer 374 changes the number of ad frames in accordance with the number of viewing users. Specific processing carried out in this case will be described with reference to FIG. 7$a$.

The processing carried out is the same as that of the first embodiment, from making a content data distribution request to the content distributing computer 156P1 from the user terminal computer 158UA1, distributing the content data and the advertisement data to the user terminal computer, and to the process of displaying the data. The present embodiment differs from the first embodiment in that it does not include the processing of step S37 and that it includes the processing below or the processing below has been modified.

The CPU of the content distributing computer 156P1 transmits the number of viewing users per unit time to the frame coordinating computer 154 after performing the processing in step S15 (step S16). The number of viewing users per unit time can be acquired by counting the number of distribution requests per content.

The CPU of the frame coordinating computer 154 determines whether the number of viewing users per unit time has been received (step S71), and upon receiving the number of viewing users per unit time, the CPU determines whether the multi-view video frame for distributing the content should be changed to an ad frame (step S3). The processing thereafter is the same.

In this way, the ad frames of the content distributing computer 156P1 are dynamically changed in accordance with the number of viewing users per unit time, and an advertisement is displayed in the increased ad frame of the user terminal computer.

Accordingly, by storing the rule to increase/decrease the number of ad frames in accordance with a fluctuation in the number of viewers per unit time of the content distributing computer, the number of ad frames can be increased when the number of viewers of the content in question increases. Thus, for example, the content with sudden increase in the page view may be determined as a high-valued content at the moment, and the number of ad frames can be increased accordingly. In contrast, the number of ad frames may also be decreased when the number of viewers of the content in question increases. Thus, for example, the content with sudden increase in the page view can be determined as including many poor-quality incoming traffic, that is, viewers just wanting to have a look at the content.

6. Fourth Embodiment

Figure 8:
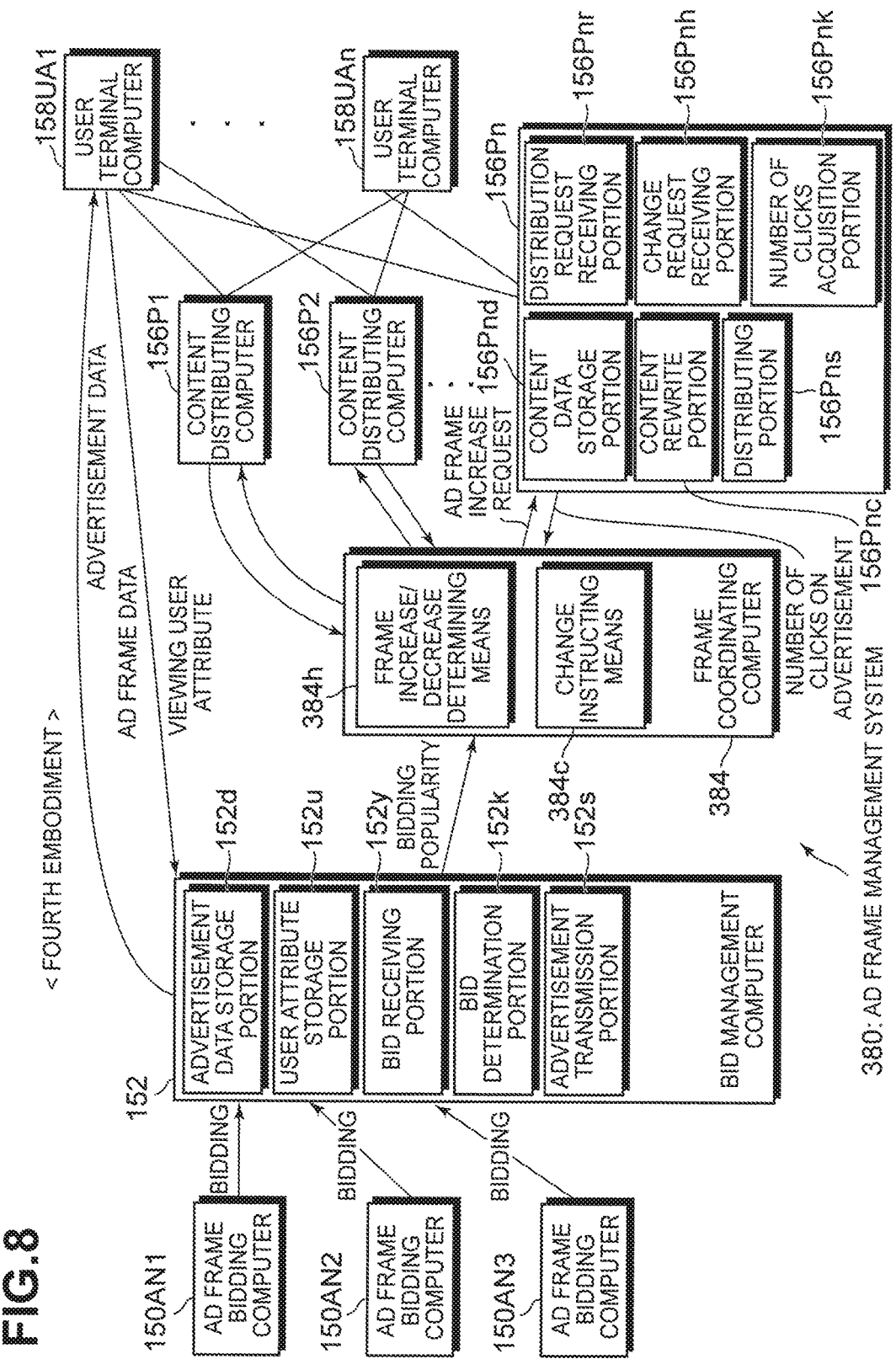
FIG. 8 is a functional block diagram illustrating an ad frame management system 380 according to a fourth embodiment.

In the second embodiment, the number of ad frames is changed in accordance with the active viewing degree, however, the ad frames can be changed in accordance with the change in the number of clicks on the advertisement per unit time in a content distributing computer. The processing carried out in this case will be described with reference to FIG. 8. The content distributing computer 156P1 includes a number of clicks acquisition portion 156PnK instead of the user operation data acquisition portion 156 Pnu in comparison with the second embodiment. The number of clicks acquisition portion 156 PnK dynamically transmits the number of Web page views and the number of clicks on the advertisement to the frame coordinating computer 384. The frame increase/decrease determining means 154h of the frame coordinating computer 384 calculates the change in an advertisement click through rate per unit time from the number of clicks on the advertisement per unit time.

Such a gathering of information can be executed by having a tag for transmitting the number of clicks to the frame coordinating computer 384 embedded in the content of the content distributing computer 156P1, and gathering the tag by the frame coordinating computer 384.

For example, as to the number of ad frames, the number of frames can be caused to be increased if the click through rate of the advertisement per unit time is higher than a threshold value. In this case, the reason for a high click through rate of the advertisement can be determined as being due to a high match rate between the content and the advertisement, improving the advertising effect thereby.

The processing carried out from transmission of the advertisement data to displaying the advertisement data on the user terminal computer 158UA1 is the same as that of the conventional method.

Further, as to the number of ad frames, the number of frames may be caused to be decreased if the click through rate of the advertisement per unit time is higher than the threshold value. Such processing can prevent the overall click through rate from deteriorating, whereas thoughtlessly increased number of advertisements may result in a poor matching between the content and the advertisement.

Figure 8A:
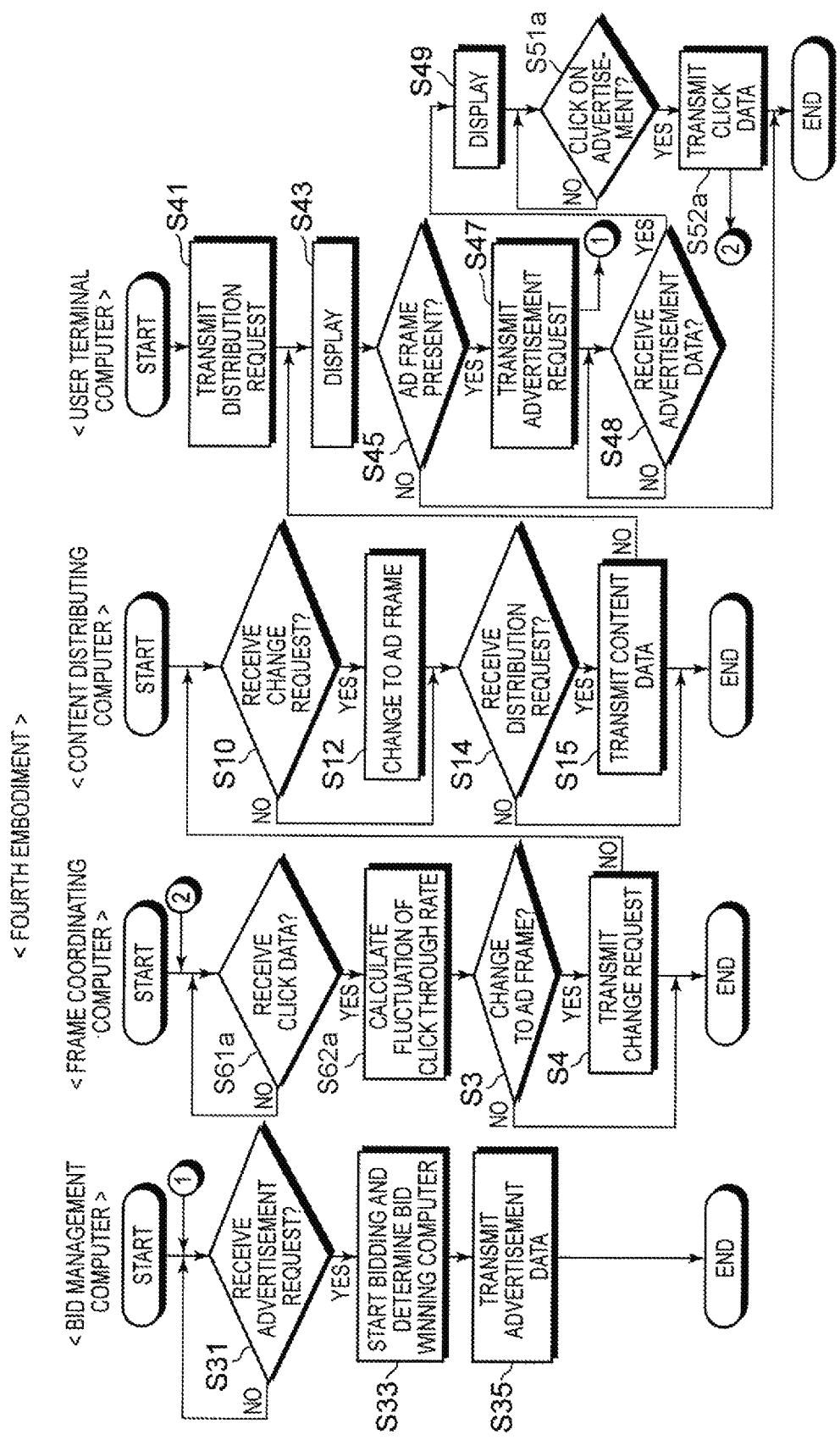
FIG. 8a is a flowchart illustrating an ad frame increase processing and advertisement display processing according to the fourth embodiment.

The processing carried out, which is illustrated in FIG. 8a, is the same as that of the second embodiment, from making a content data distribution request to the content distributing computer 156P1 from the user terminal computer 158UA1, distributing the content data and the advertisement data to the user terminal computer, and to the process of displaying the data. The present embodiment differs from the second embodiment in that processing performed in steps S51a, S52a, S61a, and S62a is different as described below.

The CPU of the user terminal computer 158UA1 determines whether one or more of the displayed ad frames have been clicked in step S51a (hereinafter referred to as an "advertisement click") (step S51a), and if there is an ad click, the ad click is transmitted to the frame coordinating compute 154 (step S52a). The CPU of the frame coordinating computer 154 determines whether advertisement click data has been received (step S61a), and upon receiving the advertisement click data, calculates the change in the click through rate (Step S62a).

In order to transmit the number of clicks on an advertisement on a certain page to the frame coordinating computer, an event tracking code can be embedded in advertisement data and have the user terminal computer 158 carry out the processing. In this way, the change in the click through rate of this advertisement can be obtained.

The click through rate can be calculated by counting the number of clicks relating to an ID of each banner ad and dividing the total number of clicks by the number of displayed times. The change in the click through rate can be obtained by calculating the change in the click through rate per unit time.

The change in the click through rate can be obtained per page on which the content having the banner advertisement is displayed, per content server that distributes the applicable page, and as overall clicks received by the frame coordinating computer, instead of per banner advertisement.

In the case of obtaining the number of clicks per page on which the content having the banner advertisement is displayed, per content server that distributes the applicable page, it is sufficient to embed the tag for transmitting a content ID or a content server ID to the frame coordinating computer.

Alternatively, the change in the click through rate can be obtained per user terminal. In this case, it is sufficient to embed the tag for transmitting the ID of the user terminal computer to the frame coordinating computer.

In this way, the ad frames of the content distributing computer 156P1 are dynamically changed in accordance with the active viewing degree, and an advertisement is displayed in the increased ad frame of the user terminal computer.

7. Fifth Embodiment

Figure 9:
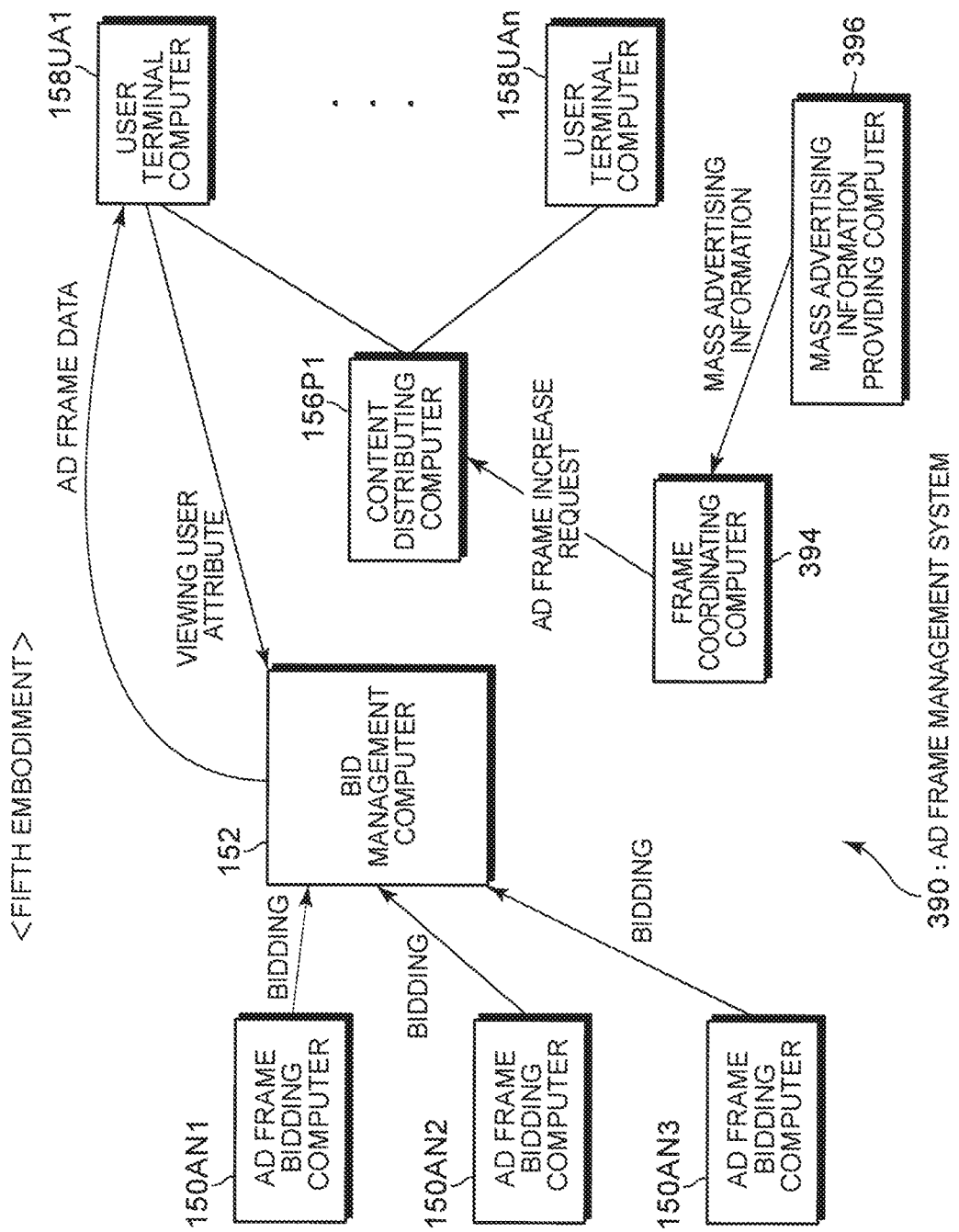
FIG. 9 is a functional block diagram illustrating an ad frame management system 390 according to a fifth embodiment.

In the above-mentioned first through third embodiments, the ad frames were changed based on events that have already occurred. However, the bidding popularity may be predicted so as to increase the number of ad frames when the bidding popularity is predicted to be high. The processing carried out in this case will be described with reference to FIG. 9.

The processing carried out from transmission of the advertisement data to displaying the advertisement data on the user terminal computer 158UA1 is the same as that of the conventional method. A mass advertising information providing computer 396 transmits the mass advertising trend information to the frame coordinating computer 384. Based on such mass advertising trend information, frame coordinating computer 384 determines the predicted bidding popularity of the content distributing computer 156P1. If the predicted bidding popularity is high, the number of ad frames is increased.

In the present embodiment, to predict the bidding popularity, the frame coordinating computer 384 acquires the gross rating point (GRP) from the mass advertising information providing computer 396. Then, the number of ad frames of the content distributing computer, which distributes a content having the same attribute as the attribute of the advertiser having an increasing the gross rating point, is increased.

For example, if the mass advertisement of an automobile manufacturer A has increased, because the category of the automobile manufacturer A is an "automobile," the number of ad frames in the content distributing computer 156 that distributes the website with a content relating to automobiles is increased.

In the present embodiment, the advertisement demand for an Internet advertisement is tried to be dealt with in advance using the GRP of the mass advertising, however, information other than GRP in the mass advertising may be adopted. For example, KPI for placing an ad in the four major advertising media, such as the advertisement columns in a newspaper, the number of advertisement pages in a magazine, GRP of a television or a radio, or the price of placing advertisements therein, or a sum thereof (combined reach, duplicate reach), and share of voice, and the like can be adopted. Here, share of voice refers to the proportion of advertisement volume of a particular product, company, or a brand with respect to the total advertisement volume of the particular product category. This is a value considered as being important on the idea that the advertising effect is determined by a relative volume (share) in comparison with the competitors rather than the absolute volume of advertisement put in (for example, advertising expenses and GRP).

Such indices may be determined according to the category of the mass-advertised advertisement. In particular, the share of voice may be determined as having a high demand for an Internet advertisement when the share of a particular company in a category in question is low. Reversely, it may also be determined that the demand for the Internet advertisement will become high and therefore the number of ad frames need to be increased when the share of the particular company in the category in question is high.

Further, there are cases where data according to target attributes are available in the four major advertising media, for example, a target rating point (TRP) in the case of a television advertisement. When such type of target-specific information is acquired from the mass advertising information providing computer 396, the target attributes may further be taken into consideration to determine whether the number of ad frames should be increased. It may also be other kind of advertisement placed in accordance with target attributes.

Further, the advertising cost and volume (the number and size) of transportation advertisement and outdoor advertisement may also be adopted besides the four major advertising media.

In the present embodiment, the mass advertising GRP is acquired from the mass advertising information providing computer 396. However, a search engine keyword ranking may be received so as to change an individual frame to an ad frame in a content distributing computer that distributes a content having attributes belonging to the same category as the keyword.

In this way, the advertisement demand may be predicted based on the changes concerning Internet web pages, in advertisements other than the mass advertising. Such changes concerning Internet web pages include, for example, exposure amount in fixed ad frame that is not subject to the Internet real-time bidding, the number of searches, the most frequent keyword of the indexer that is crawling the web page, the page rank, and the number of buzzes.

Further, instead of looking at an overall trend, in the case where the number of viewers of a particular web page as a whole increases, it may be predicted that the demand for an Internet advertisement of the page will be high.

Further, the demand for advertisement may be predicted using other KPI's relating to the demand for stock and market figures.

8. Other Embodiments

In each of the above-mentioned embodiments, the content frame is changed to an ad frame so as to increase the number of ad frames without changing the total number of content frames and ad frames. However, only the number of ad frames may be increased without decreasing the number of content frames. In this case, it is only necessary to distribute a layout data with increased number of ad frames from the content distributing computer.

In each of the above-mentioned embodiments, description was given for the case where the frame coordinating computer is provided separately. However, as shown in FIG. 10, the function of the frame coordinating computer may be executed by a computer configuring a supply-side platform (SSP). Instead, the function of the frame coordinating computer may be executed by the content distributing computer or the bid management computer. In FIG. 10, an SSP 254 receives the viewing user attributes from the content distributing computers 256P1-*n*, analyzes the viewing user attributes, and carries out a processing that optimizes the advertisement in the content distributing computer managed by the SSP 254. Since the change processing to the ad frame is the same as that in each of the above-mentioned embodiments, description thereof will be omitted.

In each of the above-mentioned embodiments, description was given for the case where the content frame to be changed to the ad frame is the individual video frame that configures a part of the multi-view video. However, such content frame is not limited thereto, and it may also be a general content frame.

In each of the above-mentioned embodiments, when the content distributing computer receives an order from the frame coordinating computer, the content distributing computer makes an individual frame that is to be distributed into an ad frame. Instead, it may be carried out as described below. First, whether there exists a content frame that can be changed to an ad frame is declared by a tag or the like in advance. Accordingly, the data is distributed to the user terminal computer in this state. The content distributing computer 156P1, upon receiving an order from the frame coordinating computer, distributes the above-mentioned information regarding changing the above-mentioned tagged frame to an ad frame to the user terminal computer. The user terminal computer comprehends this information, determines the current number of ad frames, and acquires the advertisement data to be displayed in the ad frame from the bid management computer.

Also, in each of the above-mentioned embodiments, when the content distributing computer receives an order from the frame coordinating computer, the content distributing computer makes an individual frame that is to be distributed into an ad frame. Instead, a query may be made to the content distributing computer as to whether change over to an ad frame is possible, and if the answer is yes, such a request may be made.

Further, in each of the above-mentioned embodiments, the advertisement data to be displayed in the frame that has been changed to an ad frame is distributed to the user terminal computer from the bid management computer. However, transmission of the data is not limited to this, and it may be transmitted to the user terminal computer via the content distributing computer instead.

Further, the bid management computer may inform the ad frame bidding computers that submit bids of the fact that the ad frame subjected to bidding had initially been a content frame which is now turned into an ad frame. To the contrary, the bid management computer may inform of the fact that the ad frame subjected to bidding was an ad frame from the start instead of a content frame turned into an ad frame. Accordingly, the ad frame bidding computers can use such information as a reference upon bidding.

When there are a plurality of content frames that are changeable to the ad frames, a priority for changing a content frame to an ad frame may be stored in the content distributing computer, and the content frame may be changed to an ad frame in accordance with the priority.

9. Others

In each of the above-mentioned embodiments, the system was run on a real-time bidding platform, as a precondition. However, the present invention may also be executed such that the content frame is changed to an ad frame when a request to secure a predetermined number of impression frames at a predetermined price is given by the computer configuring the demand-side platform (DSP). In this case, the system will be configured as described below.

An ad frame management system including: content distributing computer that distributes, to a user terminal computer, a distribution data including an ad frame and a content frame on one screen; and an advertisement frame purchasing computer that requests purchasing of the ad frame, the ad frame management system including: a frame coordinating computer having a frame increase/decrease determining means storing therein a rule for increasing/decreasing the number of ad frames and that determines whether to increase/decrease the number of ad frames, the increase/decrease of the number of the ad frames being executed by changing the content frame to the ad frame or changing the ad frame to the content frame without changing the total number of content frames and ad frames, and a change instructing means that gives a frame type change order to the content distributing computer when the frame increase/decrease determining means determines to increase/decrease the number of ad frames, wherein the frame increase/decrease determining means changes a content frame to an ad frame when a request to ensure an impression frame having a fixed price is given from the ad frame purchasing computer to the content distributing computer. Note that, the request to ensure an impression frame does not designate a specific content distributing computer, but designates the specific attributes of the content of the content distributing computer. Therefore, if the attributes are the same, a content frame may be changed to an ad frame.

Although it has been described that this system is not necessarily based on real-time bidding, the system may also be used in combination with the real-time bidding. For example, the condition for increasing the number of the ad frames by changing a content frame to an ad frame may be such that there is a request to ensure an impression frame as described above. As to ensuring the number of the ad frame that has been increased, the price for ensuring the impression frame and the highest bid price may be compared, and the higher of the two may be the winner.

In this case, a bid management computer that manages bidding of the ad frames according to the real-time bidding platform, and a plurality of ad frame bidding computers that submit bids to the bid management computer may be added, and the frame coordinating computer may carry out the winning bid processing.

Further, the present invention disclosed above can be comprehended as an invention described below in terms of bidding.

An ad frame management system including: a content distributing computer that distributes, to a user terminal computer, a distribution data including an ad frame and a content frame on one screen; a bid management computer that manages bidding of the ad frames according to the real-time bidding platform; and a plurality of ad frame bidding computers that submit bids to the bid management computer, wherein two types of ad frames are set, namely a fixed ad frame which had initially been an ad frame and a dynamic ad frame which had been changed from the content frame to the ad frame, and which type an ad frame belongs to is specified at the time of bidding, and the ad frame bidding computers submit different bid prices for the fixed ad frame and the dynamic ad frame.

In this case, "submit different bid prices" includes, for example, setting a higher bid price for the dynamic ad frame than the fixed ad frame, and further includes submitting a bid only for the frame which had been changed from a content frame to an ad frame without submitting a bid for the initial ad frame.

Further, the present invention can be understood as described below.

An ad frame management system including: a content distributing computer that distributes, to a user terminal computer, a distribution data including an ad frame and a content frame on one screen; a bid management computer that manages bidding of the ad frames according to the real-time bidding platform; and a plurality of ad frame bidding computers that submit bids to the bid management computer, wherein two types of ad frames are set, namely the fixed ad frame which had initially been an ad frame and the dynamic ad frame which had been changed from the content frame to the ad frame, and which type an ad frame belongs to is specified at the time of bidding, and the ad frame bidding computers submit bids for the dynamic ad frame only.

In each of the above-mentioned embodiments, the processing related to the distribution to the user terminal was executed by a browser program, and instead dedicated hardware or a software can also be mounted.

In each of the above-mentioned embodiments, URL of the recorded banner ad is transmitted to the user terminal computer 10 as an advertisement tag. However, the method for transmitting the banner ad data is not limited thereto, and for example, the banner ad itself may be transmitted to the user terminal computer. Further, in each of the above-mentioned embodiments, a blank space is transmitted as the ad frame, and the advertisement is inserted based on the advertisement tag. However, information indicating the location to insert the advertisement may be transmitted as the ad frame, and the advertisement may be inserted based on the advertisement tag.

While the present invention has been described above with reference to the embodiments thereof, it should be understood that the embodiments have been described by way of illustration and not limitation, and therefore modifications within the scope of claims attached are possible without deviating from the scope and spirit of the present invention.

ALTERNATIVE DESCRIPTIONS (1) The invention disclosed in the application may be described as follows: An AD frame management system, includes a content distributing computer that distributes a distribution datum in correspondence with a content distribution request, wherein the distribution datum includes two or more composition frames, each of which has an attribution datum specifying that the composition frame is either an AD frame for adverting or a content frame for displaying a content, each of the content frames linking with content data, and an AD tag for creating an AD data request being embedded in each of the AD frames, an area defining datum specifying a size of the composition frame, the composition frames being configured to be arranged in a single screen, and stores a plurality of the content data to be linked with the content frames, a bid management computer that stores a plurality of the AD data, each of which has its size datum specifying a size of an advertisement created by the AD datum, performs a bidding for one of the AD frames, which is defined as a bidding AD frame, the bidding being initiated by the AD data request caused by the AD tag in the AD frame, receives bids for the bidding AD frame, the bids being executed with a real time bidding platform such that each of the bids includes at least a bid price, deciding a winning bid such that one AD datum is selected for the bidding AD frame among the stored AD data of which the size data match the size datum of the bidding AD frame, and is supplied to the bidding AD frame to be displayed, a plurality of AD frame bidding computers that perform the bids for the AD frames and transmits the bids to the bid management computer, a frame coordinating computer that coordinates the attribution data of the composition frames, a user terminal computer that has the single screen wherein the user terminal computer receives the distribution datum from the content distributing computer, displays in the single screen advertisements in the AD frames, the advisements being created with the AD data supplied from the bid management computer, and contents in the content frames, the contents being created with the content data linked with the content frames, which are obtained from the content distributing computer, wherein the bid management computer calculates bid information by collecting the bids for the bidding AD frame, the frame coordinating computer comprises a frame increase/decrease determining means that determines to increase or to decrease a number of the AD frames in the distribution datum while maintaining a total frame number of the composition frames by comparing the bidding information with a predetermined threshold value, a change instructing means that creates and transmits a frame type change order to the content distributing computer in order to turn the attribution data of one or more of the content frames into those of the AD frames in a case where the number of the AD frames is determined to increase, the content distributing computer, which received the frame type change order, revises the distribution datum, by selecting one or more of the content frames to be changed, which are defined as selected content frames, and turning the attribution data of the selected content frames into those of the AD frames, which are defined as changed AD frames, wherein an AD tag is embedded to each of the changed AD frames in order to initiate a bidding for the changed AD frames such that advertisements created by the AD data supplied from the bid management computer using the AD tags are to be displayed in the changed Ad frames when the revised distribution data is distributed to the user terminal computer.

(2) Based on the different embodiment, the invention may be described as follow: an AD frame management system, includes a content distributing computer that distributes a distribution datum in correspondence with a content distribution request, wherein the distribution datum includes two or more composition frames, each of which has an attribution datum specifying that the composition frame is either an AD frame for adverting or a content frame for displaying a content, each of the content frames linking with content data, and an AD tag for creating an AD data request being embedded in each of the AD frames, an area defining datum specifying a size of the composition frame, the composition frames being configured to be arranged in a single screen, and stores a plurality of the content data to be linked with the content frames, a bid management computer that stores a plurality of the AD data, each of which has its size datum specifying a size of an advertisement created by the AD datum, performs a bidding for one of the AD frames, which is defined as a bidding AD frame, the bidding being initiated by the AD data request caused by the AD tag in the bidding frame, receives bids for the bidding AD frame, the bids being executed with a real time bidding platform such that each of the bids includes at least a bid price, deciding a winning bid such that one AD datum is selected for the bidding AD frame among the stored AD data of which the size data match the size datum of the bidding AD frame, and is supplied to the bidding AD frame to be displayed, a plurality of AD frame bidding computers that perform the bids for the AD frames and transmits the bids to the bid management computer, a frame coordinating computer that coordinates the attribution data of the composition frames, a user terminal computer that has the single screen wherein the user terminal computer receives the distribution datum from the content distributing computer, displays in the single screen advertisements in the AD frames, the advisements being created with the AD data supplied from the bid management computer, and contents in the content frames, the contents being created with the content data linked with the content frames, which are obtained from the content distributing computer, wherein the user terminal computer transmits user operation information, which is related to a clicking record operated in the user terminal computer while displaying the distribution datum, to the bid management computer, the frame coordinating computer comprises a frame increase/decrease determining means that determines to increase or to decrease a number of the AD frames in the distribution datum while maintaining a total frame number of the composition frames by comparing a statistic value calculated from the user operation information with a predetermined threshold value, a change instructing means that creates and transmits a frame type change order to the content distributing computer in order to turn the attribution data of one or more of the content frames into those of the AD frames in a case where the number of the AD frames is determined to increase, the content distributing computer, which received the frame type change order, revises the distribution data, by selecting one or more of the content frames to be changed, which are defined as selected content frames, and turning the attribution data of the selected content frames into those of the AD frames, which are defined as changed AD frames, wherein an AD tag is embedded to each of the changed AD frames in order to initiate a bidding for the changed AD frames such that advertisements created by the AD data supplied from the bid management computer using the AD tags are to be displayed in the changed Ad frames when the revised distribution data is distributed to the user terminal computer.

(3) Based on the different embodiment, the invention may be described as follow: An AD frame management system, includes a content distributing computer that distributes a distribution datum in correspondence with a content distribution request, wherein the distribution datum includes two or more composition frames, each of which has an attribution datum specifying that the composition frame is either an AD frame for adverting or a content frame for displaying a content, each of the content frames linking with content data, and an AD tag for creating an AD data request being embedded in each of the AD frames, an area defining datum specifying a size of the composition frame, the composition frames being configured to be arranged in a single screen, and stores a plurality of the content data to be linked with the content frames, a bid management computer that stores a plurality of the AD data, each of which has its size datum specifying a size of an advertisement created by the AD datum, performs a bidding for one of the AD frames, which is defined as a bidding AD frame, the bidding being initiated by the AD data request caused by the AD tag in the bidding frame, receives bids for the bidding AD frame, the bids being executed with a real time bidding platform such that each of the bids includes at least a bid price, deciding a winning bid such that one AD datum is selected for the bidding AD frame among the stored AD data of which the size data match the size datum of the bidding AD frame, and is supplied to the bidding AD frame to be displayed, a plurality of AD frame bidding computers that perform the bids for the AD frames and transmits the bids to the bid management computer, a frame coordinating computer that coordinates the attribution data of the composition frames, a user terminal computer that has the single screen wherein the user terminal computer receives the distribution datum from the content distributing computer, displays in the single screen advertisements in the AD frames, the advisements being created with the AD data supplied from the bid management computer, and contents in the content frames, the contents being created with the content data linked with the content frames, which are obtained from the content distributing computer, wherein the content distributing computer transmits user viewing information to the bid management computer, the frame coordinating computer comprises a frame increase/decrease determining means that determines to increase or to decrease a number of the AD frames in the distribution data while maintaining a total frame number of the composition frames by comparing a statistic value calculated from the user viewing information with a predetermined threshold value, a change instructing means that creates and transmits a frame type change order to the content distributing computer in order to turn the attribution data of one or more of the content frames into those of the AD frames in a case where the number of the AD frames is determined to increase, the content distributing computer, which received the frame type change order, revises the distribution data, by selecting one or more of the content frames to be changed, which are defined as selected content frames, and turning the attribution data of the selected content frames into those of the AD frames, which are defined as changed AD frames, wherein an AD tag is embedded to each of the changed AD frames in order to initiate a bidding for the changed AD frames such that advertisements created by the AD data supplied from the bid management computer using the AD tags are to be displayed in the changed Ad frames when the revised distribution data is distributed to the user terminal computer.

The invention claimed is:

1. An AD frame management system in which a web page including an advertisement is displayed at a user terminal computer (158) of a user, comprising:
    a content distributing computer (156) that
        distributes the web page in correspondence with a content distribution request from the user terminal computer, wherein the web page is composed with two or more of the composition frames, each of which has an attribution tag and its size datum, the attributing tag specifying that the composition frame is either an AD frame for displaying an advertisement or a content frame for displaying a content, and
    a frame coordinating computer (154) that switches the attribution tags of the composition frames between the AD frames and the content frames, wherein
    the AD frame management system further comprises a bid management computer (152) that
        is connected to a plurality of AD frame bidding computers (150AN),
        executes a bidding operation, which is initiated by an advertisement request transmitted from the user terminal computer (S31), by receiving bids from the AD frame bidding computers such that at least one advertisement datum is determined as a winning advertisement based on a bidding result created from the bidding operation (S33) wherein the one advertisement datum is determined as a winning AD datum, and
        creates the bidding popularity by collecting the bids, the bidding popularity indicating degrees of interests on the web page,
    the frame coordinating computer
i) receives the bidding popularity from the bid management computer (S1),
ii) determines if the bidding popularity is greater than a predetermined threshold value (S2),
iii) when yes, creates a frame type change request in order to turn the attribution tag of one content frame into one AD frame, transmitting the frame type change request to the content distributing computer (S4),
iv) when no, does not create the frame type change request, and
    the content distributing computer, which received the frame type change request (S10),
        selects one content frame to be changed, which are defined as selected content frame, and switches the attribution tag of the selected content frame into that of the AD frame related to the winning AD datum, wherein a size of advertisement linked with the AD frame matches the size of the selected content frame by referring to the size datum, and the content distributing computer, when receiving another content distribution request, distributes the web page (S15), which have been revised by switching the attribution tags of the selected content frame.

2. The AD frame management system according to claim 1, wherein the content distribution request is transmitted from the user terminal computer to the content distributing computer with the cookie recorded in the user terminal computer.

3. The AD frame management system according to claim 1, wherein the bidding popularity is a total number of the bids that are submitted from the AD frame bidding computers to the bid management computer, and the frame coordinating computer creates the frame type change request when the total number of bids is greater than the predetermined threshold value.

4. The AD frame management system according to claim 1, wherein the bidding popularity is a related bid price, which is either the highest bid price among all bid prices of the submitted bits or a total bid price amount that sums all the bid prices, and the frame coordinating computer creates the frame type change request when the related bid price is greater than the predetermined threshold value.

5. The AD frame management system according to claim 1, wherein the bidding popularity is a change rate of the bits that indicates a number of bids changing per a unit period, and the frame coordinating computer creates the frame type change request when the related bid price is greater than the predetermined threshold value.

6. The AD frame management system according to claim 1, wherein the user terminal computer and the another user terminal computer are the same.

7. The AD frame management system according to claim 1, wherein the size of advertisement and the size of the selected content frame respectively mean an aspect ratio of advertisement and an aspect ratio of the selected content frame.

8. An AD frame management system for displaying a web page including advertisement, comprising:

a user terminal computer that displays the web page, a content distributing computer (156) that distributes the web page to the user terminal computer in correspondence with a content distribution request from the user terminal computer, wherein the web page is composed with two or more of the composition frames, each of which has an attribution tag and its size datum, the attributing tag specifying that the composition frame is either an AD frame for displaying an advertisement or a content frame for displaying a content, and a frame coordinating computer (154) that switches the attribution tags of the composition frames between the AD frames and the content frames, and a bid management computer (152) that is connected to a plurality of AD frame bidding computers (150AN), executes a bidding operation, which is initiated by an advertisement request transmitted from the user terminal computer (S31), by receiving bids from the AD frame bidding computers, and creates a bidding popularity by collecting the bids, the bidding popularity indicating degrees of interests on the web page, and transmits the bidding popularity to the frame coordinating computer, wherein the frame coordinating computer further comprises a frame increase/decrease determining means (154$h$) by which a number of the AD frames is determined in accordance with the bidding popularity, wherein the number of the AD frames is defined as a designated number, the frame increase/decrease determining means i) determines if the bidding popularity is greater than a predetermined threshold value (S2), ii) when yes, creates an AD frame increase request in order to turn a number of content frames into AD frames by switching their attribution tags, wherein the number of content frames is the same as the designated number, iii) when no, creates an AD frame decrease request in order to turn a number of AD frames into content frames by switching their attribution tags, wherein the number of AD frames is the same as the designated number, iv) transmits one of the AD frame increase request and the AD frame decrease request to the content distributing computer (S4), wherein the one of the AD frame increase request and the AD frame decrease request is defined as a frame type change request, the content distributing computer, which received the frame type change request (S10), selects content frames or AD frames to be changed, which are defined as selected frames, and switches the attribution tags of the selected frames in correspondence with the frame type change request, wherein sizes of contents or advertisements to be placed in the selected frames match the sizes of the selected frames by referring to the size data, and the content distributing computer, when receiving another content distribution request, distributes the web page (S15), which have been revised by switching the attribution tags of the selected frame.

9. The AD frame management system according to claim 8, wherein the content distribution request is transmitted from the user terminal computer to the content distributing computer with the cookie recorded in the user terminal computer.

10. The AD frame management system according to claim 8, wherein the bidding popularity is a total number of the bids that are submitted from the AD frame bidding computers to the bid management computer, and the frame increase/decrease determining means uses the total number of bids to determine the designated number.

11. The AD frame management system according to claim 8, wherein the bidding popularity is a related bid price, which is either the highest bid price among all bid prices of the submitted bits or a total bid price amount that sums all the bid prices, and the frame increase/decrease determining means uses the related bid price to determine the designated number.

12. The AD frame management system according to claim 8, wherein
the bidding popularity is a change rate of the bits that indicates a number of bids changing per a unit period, and
the frame increase/decrease determining means uses the change rate of the bits to determine the designated number.

13. The AD frame management system according to claim 8, wherein
the user terminal computer and the another user terminal computer are the same.

14. The AD frame management system according to claim 8, wherein
the sizes of contents or advertisements to be placed in the selected frames mean aspect ratios thereof, and
the sizes of the selected frame mean aspect ratios thereof.

* * * * *